US008466791B2

(12) United States Patent
Goto et al.

(10) Patent No.: US 8,466,791 B2
(45) Date of Patent: Jun. 18, 2013

(54) COMMUNICATION DEVICE, ANTENNA DEVICE, AND COMMUNICATION SYSTEM

(75) Inventors: Tetsuro Goto, Kanagawa (JP); Kenichi Kabasawa, Saitama (JP); Masaya Takano, Tokyo (JP); Kazuya Hirano, Tokyo (JP)

(73) Assignee: Sony Corporation, Tokyo (JP)

(*) Notice: Subject to any disclaimer, the term of this patent is extended or adjusted under 35 U.S.C. 154(b) by 508 days.

(21) Appl. No.: 12/777,675

(22) Filed: May 11, 2010

(65) Prior Publication Data

US 2010/0302039 A1 Dec. 2, 2010

(30) Foreign Application Priority Data

May 26, 2009 (JP) ................................ P2009-126411

(51) Int. Cl.

*G08B 13/14* (2006.01)
*H01Q 7/08* (2006.01)
*H04B 1/38* (2006.01)

(52) U.S. Cl.

USPC ..................... 340/572.7; 340/572.8; 343/788; 455/90.3

(58) Field of Classification Search

USPC .................... 340/572.7, 572.8, 10.3; 343/788
See application file for complete search history.

(56) References Cited

U.S. PATENT DOCUMENTS

| | | | | |
|---|---|---|---|---|
| 2005/0001031 | A1 | 1/2005 | Akiho et al. | |
| 2008/0018473 | A1* | 1/2008 | Tsai et al. | 340/572.7 |
| 2009/0160719 | A1* | 6/2009 | Kato et al. | 343/742 |

FOREIGN PATENT DOCUMENTS

| | | |
|---|---|---|
| JP | 2004-153463 | 5/2004 |
| JP | 2004-166176 | 6/2004 |
| JP | 2006-005836 | 1/2006 |

* cited by examiner

*Primary Examiner* — Brian Zimmerman
*Assistant Examiner* — Omeed Alizada
(74) *Attorney, Agent, or Firm* — K&L Gates LLP

(57) ABSTRACT

A communication device includes a conductor plane, a first loop antenna disposed on one surface of the conductor plane via a first magnetic sheet, a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna, and a communication circuit processing a communication signal transmitted and received by the first and second loop antennas.

10 Claims, 29 Drawing Sheets

COMMUNICATION DEVICE, ANTENNA DEVICE, AND COMMUNICATION SYSTEM

CROSS REFERENCES TO RELATED APPLICATIONS

The present application claims priority to Japanese Priority Patent Application JP 2009-126411 filed in the Japan Patent Office on May 26, 2009, the entire content of which is hereby incorporated by reference.

BACKGROUND

The present application relates to a communication device performing a communication operation as a reader/writer (initiator) transmitting a request command or as a transponder (target) returning a response command in response to a request command in non-contact communication, and also relates to an antenna device for use in non-contact communication. In particular, the present application relates to a communication device, antenna device, and communication system performing non-contact communication with loop-antenna electromagnetic induction.

As a communication system in which a communication terminal without its own electric-wave generating source wirelessly transmits data to a communication counterpart, a non-contact communication system, called a radio frequency identification (RFID) system, is applied to many non-contact IC cards. The RFID system includes an integrated circuit (IC) card as a transponder and a device to read and write information from and to the IC card (referred to below as a reader/writer). The reader/writer starts intercommunication by initially outputting an electromagnetic wave (that is, taking the initiative in communication), so it is also called an initiator. The transponder, such as an IC card, is a target returning a response (intercommunication start response) in response to a command (intercommunication start request) from the initiator.

Examples of types of non-contact communication techniques applicable to RFID include an electrostatic coupling type, an electromagnetic induction type, and an electric-wave communication type. Also, according to the transmission distance, RFID systems can be classified into three types, that is, a close-coupled type (0 to 2 mm or shorter), a proximity type (0 to 10 cm or shorter), and a vicinity type (0 to 70 cm or shorter), and are defined by international standards of, for example, ISO/IEC 15693, ISO/IEC 14443, and ISO/IEC 15693, respectively. Among these, proximity-type IC-card standards complying with ISO/IEC 14443 include Type A, Type B, and FeliCa®, for example.

Furthermore, near field communication (NFC) developed by Sony Corporation and Koninklijke Philips Electronics N.V. is an RFID standard mainly defining specifications of an NFC communication device (reader/writer) communicable with an IC card of each of Type A and FeliCa, and became an international standard as ISO/IEC IS 18092 in December, 2003. The NFC communication technique inherits Felica of Sony Corporation and Mifare of Koninklijke Philips Electronics N.V., which are widely applied to non-contact IC cards; with the use of a band of 13.56 MHz, non-contact bidirectional communication of a proximity type (on the order of 10 cm) can be performed through electromagnetic induction (NFC defines not only communications between a card and a reader/writer but also active-type communications between readers/writers).

Non-contact communication in the past is mainly for billing and personal authentication, and communication rates of 106 kbps to 424 kbps are sufficient. However, in consideration of various applications, such as streaming transmission, to exchange large-capacity data with the same access time as before, the communication rate is increased. For example, in FeliCa communication, a multiple of 212 kbps, such as 424 kbps, 848 kbps, 1.7 Mbps, or 3.4 Mbps, is defined, and 212 kbps or 424 kbps is mainly used now. In the future, the communication rate may be increased to 848 kbps, 1.7 Mbps, or 3.4 Mbps.

FIG. 16 illustrates the basic configuration of an NFC communication system. The NFC communication system includes an initiator that starts communication and a target as a communication target.

Specifically, the initiator is an NFC-compliant reader/writer (R/W) that operates in a reader/writer mode. The reader/writer as the initiator is connected to a host device via a host interface, such as a universal asynchronous receiver-transmitter (UART). The host device corresponds to a personal computer (PC) and an embedded central processing unit (CPU) inside the reader/writer. The target is a transponder, such as an NFC-compliant card, or an NFC-compliant reader/writer that operates in a card mode (these examples of the target are also collectively referred to below simply as a card). The card may be stand-alone, or may be connected to the host device.

In passive-type intercommunication, the initiator performs amplitude shift keying (ASK) modulation on a carrier signal at 13.56 MHz emitted from it to superpose transmission data for transmission to the target. The target performs load modulation on a non-modulated carrier at 13.56 MHz sent from the initiator to transmit the transmission data to the initiator. In active-type intercommunication, the initiator and the target each perform ASK modulation on a carrier signal at 13.56 MHz emitted from them to superpose transmission data for transmission to its communication counterpart.

Upon receiving a communication start command from the host device (refer to (1) in FIG. 16), the initiator first sends a carrier wave. Then, to confirm whether the target is present in a communicable space, the initiator transmits a response request signal through a technique defined in the standard (about the carrier frequency, data modulation speed, and data details) (refer to (2) in FIG. 16).

By contrast, the target is first started by being supplied with power by an induced electromotive force of the carrier sent by the initiator, and enters a receivable state after which the target receives a response request signal sent from the initiator. Then, when the received response request signal is a signal matching its own type, the target performs load modulation on the non-modulated carrier from the initiator through the technique defined by the standard (about the data modulation speed, response timing, and data details) to make a response with a response signal including its own identification information (refer to (3) in FIG. 16).

Upon receiving the response signal from the target, the initiator transmits that information to the host device (refer to (4) in FIG. 16). Upon identifying the number of targets present in the communicable space and identification information of each target, the host device makes a transition to a phase of communication with a specific target according to an operation program (firmware). With this, passive-type intercommunication is established. After the communication is established, the initiator typically continues to output a carrier wave until necessary communication ends so as to send necessary power to the target.

As with the response request operation described above, also at the time of data communication, data transmission is performed through intensity modulation of the carrier wave from the initiator to the target and load modulation of the non-modulated carrier from the target to the initiator.

FIG. 17 mainly illustrates an example of the structure of an inductive-coupling portion of a non-contact communication system of an electromagnetic induction type. With electromagnetic coupling between antenna resonant circuits 12 and 32 included in an initiator 10 and a target 30, respectively, information signals are transmitted and received.

The antenna resonant circuit 12 of the initiator 10 includes a resistor $R_1$, a capacitor $C_1$, and a coil $L_1$ as a loop antenna, and transmits an information signal generated by a processing unit 11 to the target 30. The antenna resonant circuit 12 also receives an information signal from the target 30 for supply to the processing unit 11. Here, the resonance frequency unique to the antenna resonant circuit 12 is set at a predetermined value in advance based on a capacitance of the capacitor $C_1$ and an inductance of the coil $L_1$. The coil $L_1$ as a loop antenna is magnetically coupled to a coil $L_2$ of the target 30, which will be described further below, with a coupling coefficient $K_{13}$.

On the other hand, the antenna resonant circuit 32 of the target 30 includes a resistor $R_2$, a capacitor $C_2$, and a coil $L_2$ as a loop antenna, and transmits an information signal generated by a processing unit 31 and modulated by a load-switching modulation circuit 33 to the antenna (coil $L_2$) of the reader/writer (initiator) 10. The antenna resonant circuit 32 also receives an information signal from the reader/writer for supply to the processing unit 31. Here, the resonance frequency of the antenna resonant circuit 32 is set at a predetermined value in advance based on a capacitance of the capacitor $C_2$ and an inductance of the coil $L_2$. The coil $L_2$ as a loop antenna is magnetically coupled to the coil $L_1$ of the initiator 10 described above with the coupling coefficient $K_{13}$.

FIG. 18 illustrates an antenna shape of a general NFC-compliant card. In the depicted antenna shape, a rectangular antenna coil is formed in a general IC-card shape of 85.6 mm×54.0 mm, which is defined by standards, such as ISO/IEC 7816-2 and JIS 6301-II, for use in FeliCa, RC-S860, and others, along an outer periphery of the card to ensure power as large as possible. Here, the ISO 14443 standard does not particularly define the shape of an antenna coil or the number of turns of the coil. It is recommended to form a coil so as to enclose a place where a contact IC card defined by the ISO/IEC 7816-2 standard contacts.

When the target is a no-power-supply card including an IC chip, power supply with a carrier may be performed in the above-described non-contact communication system simultaneously with data communication. The principle of operation of the non-contact communication system in this case is described with reference to FIGS. 19A to 19C.

FIG. 19A illustrates an equivalent circuit of two loop antennas for magnetic coupling with a flow of carriers between loop antennas at the time of data communication from an initiator to a target. The initiator performs ASK modulation on a carrier at 13.56 MHz sent from its own for data transfer to the target.

FIG. 19B illustrates a flow of carriers between loop antennas at the time of data communication from a target to an initiator and an equivalent circuit near a loop antenna on a target side. By changing its own antenna load with an electrical switch, the target performs modulation (load modulation) on non-modulated carriers at 13.56 MHz coming from the initiator for data transfer to the initiator.

FIG. 19C illustrates a flow of carriers between loop antennas at the time of power supply from an initiator to a target and an equivalent circuit near a loop antenna. The target rectifies carriers at 13.56 MHz sent from the initiator to obtain circuit driving power.

FIGS. 20A and 20B each schematically depict the state where an electromagnetic wave propagates from an antenna line. In general, an electromagnetic wave at a place sufficiently away from an output end of an antenna (half or longer than a wavelength λ of a carrier) propagates through the air with a magnetic field and an electric field in a pair. That is, when a current flows through an antenna line, a magnetic field first occurs, and then an electric field occurs in a direction perpendicular to this magnetic field. Then, a change is repeated alternately between a magnetic field and an electric field, proceeding as water ripples as depicted in these drawings. An electromagnetic wave having a wavelength λ equal to or greater than 0.1 mm (a frequency of 3000 GHz or lower) is called an electric wave.

As evident from FIGS. 20A and 20B, an electric wave radiated from a sufficiently distant place typically has a magnetic-field component. When strong electric waves associated with external wireless communication or the like are incident (refer to FIG. 21B) to a non-contact communication system using magnetic-field coupling (refer to FIG. 21A), communication is interfered and a trouble occurs. Such electric waves causing a communication trouble are referred to below as jamming waves.

When the communication characteristic of the non-contact communication system is sufficiently good, the influence of the jamming waves can be neglected. However, for example, when the distance between the antennas is long and high-speed communication degrades the characteristic, the influence of jamming waves becomes apparent.

In a non-contact communication system using 13.56 MHz in the past, the antenna has a strong frequency resonance characteristic with approximately 13.56 MHz as a peak to extend a communication distance and improve communication stability (refer to FIG. 22). Therefore, this system is hardly affected by jamming waves in a band of 90 to 800 MHz (TV broadcasting), a band of 800 MHz/1.5 GHz, a band of 2.0 GHz (portable phones), a band of 2.4 GHz/5 GHz (Bluetooth communication and wireless LAN), and others, used for many consumer wireless communications. Also, with a sufficiently low communication rate, the system can be sufficiently resistant to jamming waves at the time of reception.

By contrast, when the communication rate of the non-contact communication system is increased for large-capacity data transfer (described above), the frequency band of a transmission signal becomes wider proportionally. A wider signal frequency band means a flat frequency characteristic, thereby causing the system to be prone to be affected by disturbance. Therefore, for wide-band baseband communication, a mechanism of removing external jamming waves is typically desired.

As the most simple technique of improving the characteristic of wireless communication, a technique of increasing an output electric-wave intensity from a transmission side and improving an S/N ratio on a reception side can be taken. However, in the radio law enacted in each country, the electric-field intensity and the magnetic-field intensity that can be radiated to outside by a wireless device are restricted to prevent an adverse effect on other communication systems and the health of human body. The communication device for non-contact communication described above also abides by this law regulation when applied to commercial products.

FIG. 23 illustrates regulations for an output electric-wave intensity in a non-contact communication system (inductive read/write communication equipment) using 13.56 MHz stipulated in Ordinance for Enforcement of the Radio Law of Japan, Articles 44 and 46-2. Depending on the electric-field intensity discharged from the inductive read/write communication equipment, the application level necessary in the Ministry of Internal Affairs and Communications in Japan varies, roughly among the following three types (1) to (3).

(1) A communication device with its electric-field intensity within an extremely weak region depicted in FIG. 23 in all frequencies is an extremely-weak wireless station, and any application to the Ministry of Internal Affairs and Communications in Japan can be eliminated.

Here, an actually stipulated value according to the Radio Law is such that the electric-field intensity at a position 3 m away from the equipment is equal to or smaller than 500 μm/m. By contrast, in FIG. 23, for illustration in the same graph, values are converted to those at a position 10 m away from the equipment (150 μm/m). This stipulation is applied not only to conductive read/write communication equipment but also to wireless equipment using another band.

(2) When the stipulated value of the magnetic-field intensity in (1) above is not satisfied, a type-specific authentication can be made as long as the following four conditions are satisfied: a carrier frequency of 13.56 MHz; an error in carrier frequency is within 50 ppm; the electric-field intensity at a position 10 m away from equipment is within an individual authentication unnecessary region in FIG. 23 in all frequencies; and the entire spurious power is equal to or smaller than 50 μW. That is, a type specification of a communication device can be obtained through an application to the Ministry of Internal Affairs and Communication and, for those equivalent to the applied communication device (that is, for those identical in type to the applied communication device), any subsequent applications to the Ministry of Internal Affairs and Communications for equipment permission for each piece of equipment can be eliminated.

(3) When the condition (2) is not satisfied, an application is made to the Ministry of Internal Affairs and Communications for each piece of equipment to obtain equipment permission.

On the other hand, as for a magnetic-field intensity emitted from induction-type read/write communication equipment, the Radio Law stipulates that the amount of exposure for six minutes should be 0.16 mA or lower.

In general, when the electric-field intensity and the magnetic-field intensity of electric waves that can be output from the same loop antenna are compared, the electric-field intensity is restricted more severely by far (to a lower value). Therefore, in a non-contact communication system using loop-antenna magnetic-field coupling, output electric waves are restricted by a limit value of the electric-field intensity. This can be an obstacle to performance improvement of the non-contact communication system (such as extension of the communication distance and increase in speed).

In brief, the problems are as follows.

(1) Due to a steep frequency characteristic, the non-contact communication system using a 13.56 MHz band in the past is less prone to be affected by jamming waves. However, to increase an output electric-wave intensity with the aim of improving communication characteristics on a reception side, such as an S/N ratio, particular attention is paid to abiding by the restrictions on the electric-field intensity stipulated by the Radio Law.

(2) In a wideband baseband non-contact communication system, due to a flat frequency characteristic, the system is prone to be affected by jamming waves, and removal of disturbance is to be considered.

Japanese Unexamined Patent Application Publications Nos. 2004-153463, 2004-166176, and 2006-5836 are examples of related art.

SUMMARY

It is desirable to provide an excellent communication device, antenna device, and communication system allowing non-contact communication to be suitably performed with electromagnetic induction between loop antennas.

It is further desirable to provide an excellent communication device, an antenna device, and communication system allowing high-speed, wide-band non-contact communication while suppressing an influence of jamming waves.

It is still further desirable to provide an excellent communication device, an antenna device, and communication system capable of increasing an output electric-wave intensity to improve an S/N ratio on a reception side and improve characteristics of wireless communication while laws and regulations restricting intensities of electric fields and magnetic fields radiated to the outside are abided by.

According to an embodiment, a communication device includes a conductor plane, a first loop antenna disposed on one surface of the conductor plane via a first magnetic sheet, a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna; and a communication circuit processing a communication signal transmitted and received by the first and second loop antennas.

According to another embodiment, in the communication device according to the embodiment described above, the conductor plane is sufficiently larger in area than an opening shape of each of the first and second loop antenna and each of the magnetic sheets.

According to still another embodiment, in the communication device according to the embodiment described first, the communication device is applied to a non-contact communication system with a steep frequency characteristic, and the communication circuit increases an output electric-wave intensity.

According to yet another embodiment, in the communication device according to the embodiment described third, the first loop antenna and the second loop antenna are connected in series to the communication circuit.

According to yet another embodiment, in the communication device according to the embodiment described first, the first and second loop antennas are each formed of a shielded loop antenna with a layered structure formed on a single substrate, and the communication circuit performs wide-band baseband communication.

According to yet another embodiment, in the communication device according to the embodiment described fifth, the first loop antenna and the second loop antenna are connected in parallel to the communication circuit.

According to yet another embodiment, an antenna device includes a conductor plane, a first loop antenna disposed on one surface of the conductor plane via a first magnetic sheet, a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna, and a communication circuit processing a communication signal transmitted and received by the first and second loop antennas.

According to yet another embodiment, a communication system includes an initiator and a target, the initiator including a conductor plane, a first loop antenna disposed on one surface of the conductor plane via a first magnetic sheet, a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna, and a communication circuit processing a communication signal transmitted and received by the first and second loop antennas, and the target including a third loop antenna coupling to a magnetic field of either one of the first and second loop antennas and a communication circuit processing a communication signal transmitted and received by the third loop antenna.

The system described herein is a substance obtained by logically collecting a plurality of devices (or function modules performing a specific function), and whether these devices and function modules are in a single housing does not particularly matter.

According to an embodiment, it is possible to provide an excellent communication device, antenna device, and communication system allowing non-contact communication to be suitably performed with electromagnetic induction between loop antennas.

According to an embodiment, it is possible to provide an excellent communication device, an antenna device, and communication system allowing high-speed, wide-band non-contact communication while suppressing an influence of jamming waves.

According to an embodiment, it is possible to provide an excellent communication device, an antenna device, and communication system capable of increasing an output electric-wave intensity to improve an S/N ratio at a reception side and improve characteristics of wireless communication while laws and regulations restricting intensities of electric fields and magnetic fields radiated to the outside are abided by.

According to an embodiment described first, seventh, and eighth, the first and second loop antennas, opening structures of which are approximately the same in shape and loop directions of which are opposite, are disposed on the respective surfaces of the conductor plane so as to be vertically symmetrical to each other, and the magnetic field generated by each loop antenna can be divided vertically by the conductor plane. Also, the first and second loop antennas are attached to the conductor plane via the first and second magnetic sheets, respectively, and these magnetic sheets absorb electric waves. Therefore, no magnetic field is applied to the conductor planes, thereby preventing an eddy current from occurring inside the conductor.

According to an embodiment described first, seventh, and eighth, the magnetic fields output from the first and second loop antennas are opposite in phase, and electric waves radiated in an antenna-surface horizontal direction cancel each other out. Therefore, of the electric fields radiated to the outside, only a component in an antenna-surface vertical direction remains, and the electric field radiated in the antenna-surface horizontal orientation can be suppressed.

According to an embodiment described first, seventh, and eighth, for example, when an original receiving operation is performed by using the first loop antenna, the second loop antenna has a reception characteristic equivalent of that of the first loop antenna for an electric wave incident in the antenna-surface horizontal direction, and has an opposite loop direction. Therefore, the components of the jamming waves received at the first loop antenna can be cancelled out with the components of the jamming waves received at the second loop antenna.

According to an embodiment described second, the conductor plane is sufficiently larger in area than the opening shapes of the first and second loop antennas and the magnetic sheet. Therefore, the conductor plane can reliably play a role of interrupting interaction of the first and second loop antennas.

According to an embodiment described third, for example, when an original transmitting operation is performed by using the first loop antenna, the second loop antenna can have a canceling effect of suppressing a radiated electric field in an antenna-surface horizontal direction. As a result, the output electric-wave intensity of the first loop antenna can be increased while abiding by the restrictions of the Radio Law, thereby improving characteristics of wireless communications, such as improving an S/N ratio on a reception side, extending a communication distance, and improving communication stability. Also, in a communication system including a reader/writer and a no-power-supply IC card, the communication device according to the embodiment described third is applied to the reader/writer to generate a large inductive power on the card. By rectifying this power, a supplied-power value can be improved.

According to an embodiment described fourth, the first and second loop antennas having a steep frequency characteristic are connected to the communication circuit in series. Therefore, for example, even when the first loop antenna is magnetically coupled to a loop antenna as a communication counterpart, the impedance is not degraded, and the effect of canceling jamming waves by the second loop antenna is not decreased.

According to an embodiment described fifth, shielded loop antennas are used as the first and second loop antennas. Therefore, electric-field components of an electrostatic magnetic field and a radiation field unwanted in a non-contact communication system of an electromagnetic inductance type can be shielded for suitable wide-band baseband communication using an inductive electromagnetic field. Also, for example, when an original receiving operation is performed by using the first loop antenna, the second loop antenna can have an effect of canceling components of jamming waves received by the first antenna to increase resistance to jamming waves to a practical level.

According to an embodiment described sixth, the first and second loop antennas are connected to the communication circuit in parallel. Therefore, a shift in waveform phase between the antenna loops due to propagation delay hardly occurs even in wide-band communication with a flat frequency characteristic. Therefore, for example, when an original receiving operation is performed by using the first loop antenna, the effect of canceling jamming waves by the second loop antenna is not decreased.

According to an embodiment described eighth, a non-contact communication system including a reader/writer operating as an initiator and a no-power-supply IC card operating as a transponder can be constructed. When the IC card follows the standard in related art, manufacturing costs can be left unchanged. On the other hand, by applying a new antenna device in which a pair of loop antennas are mutually superposed only on the reader/writer side, the output electric-wave intensity can be increased while the regulations of the Radio Law are abided by, thereby improving characteristics of wireless communication, such as improving an S/N ratio on an IC card side, extending a communication distance, and improving communication stability.

Additional features and advantages are described herein, and will be apparent from the following Detailed Description and the figures.

DETAILED DESCRIPTION

The present application is described in detail below with reference to the drawings according to an embodiment.

Figure 18:
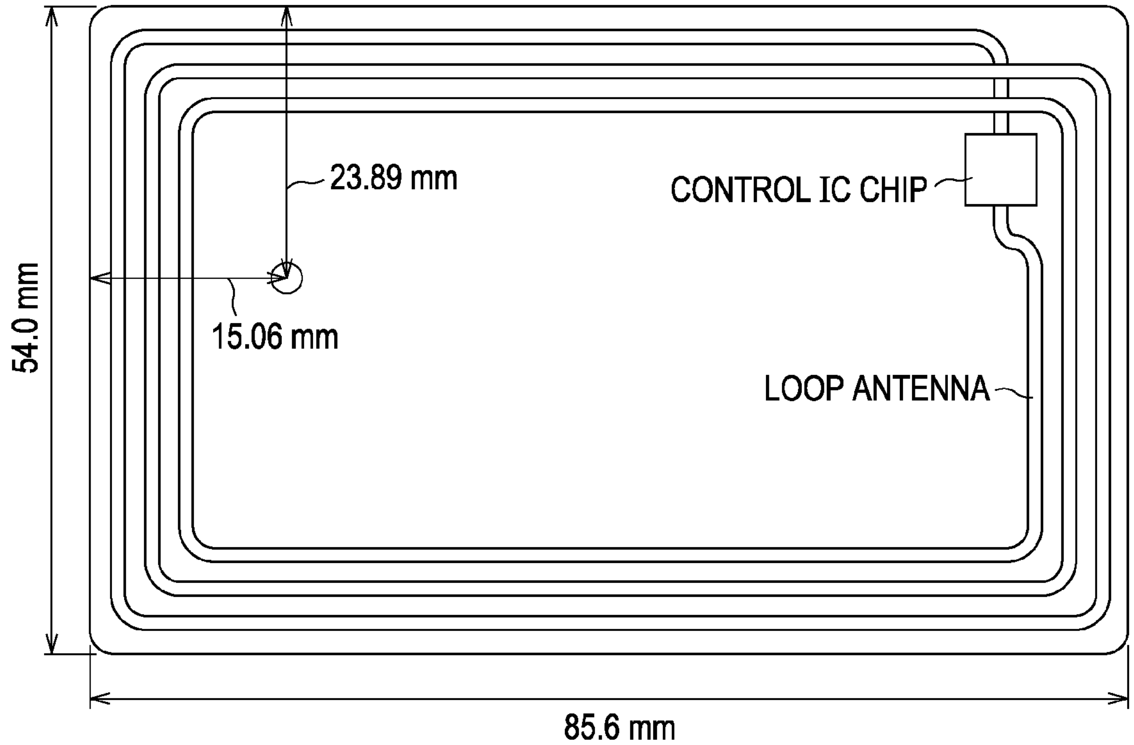
FIG. 18 illustrates an antenna shape of a general NFC-compliant card.
Figure 19A:
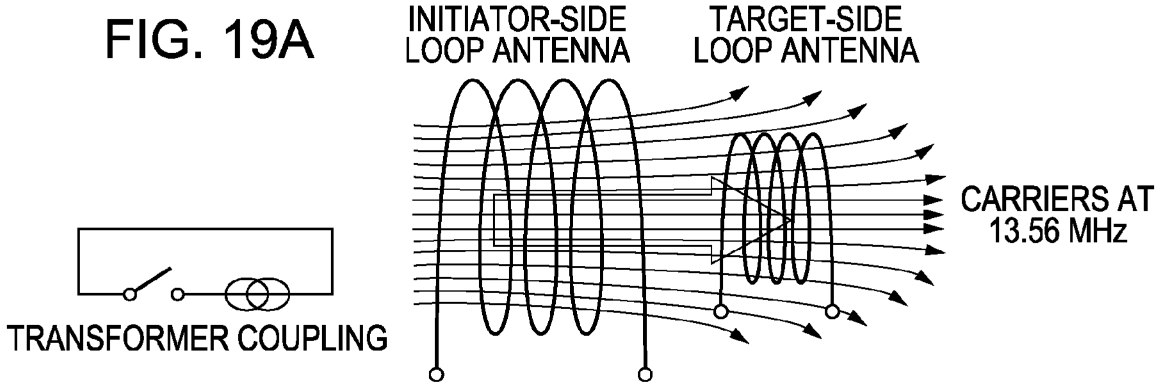
FIG. 19A illustrates the principle of operation of a non-contact communication system.
Figure 19B:
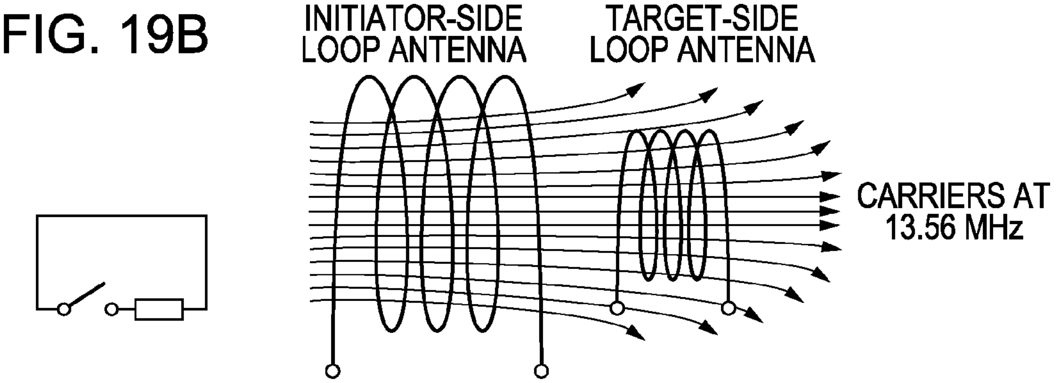
FIG. 19B illustrates the principle of operation of the non-contact communication system.
Figure 19C:
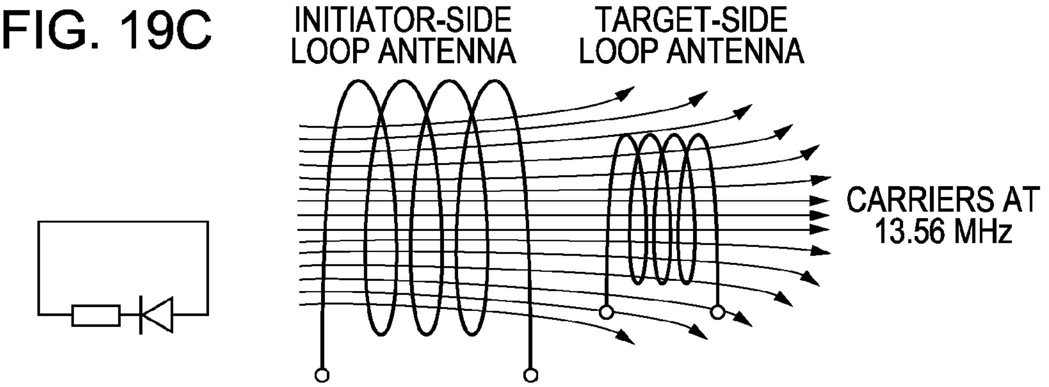
FIG. 19C illustrates the principle of operation of the non-contact communication system.
Figure 20A:
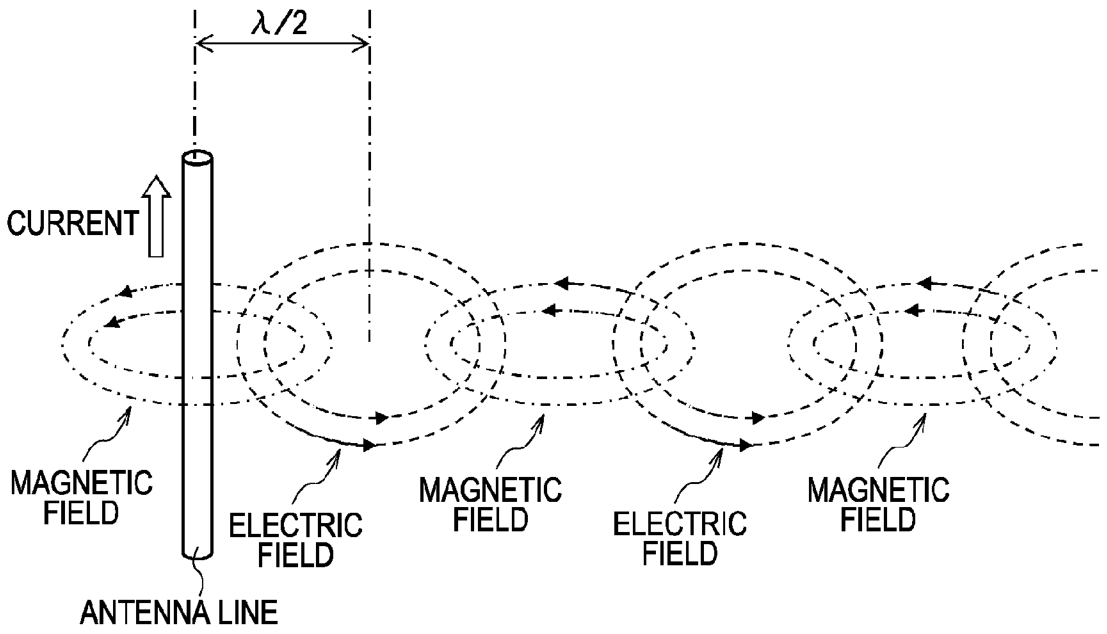
FIG. 20A schematically illustrates the state where an electromagnetic wave propagates from an antenna line.
Figure 20B:
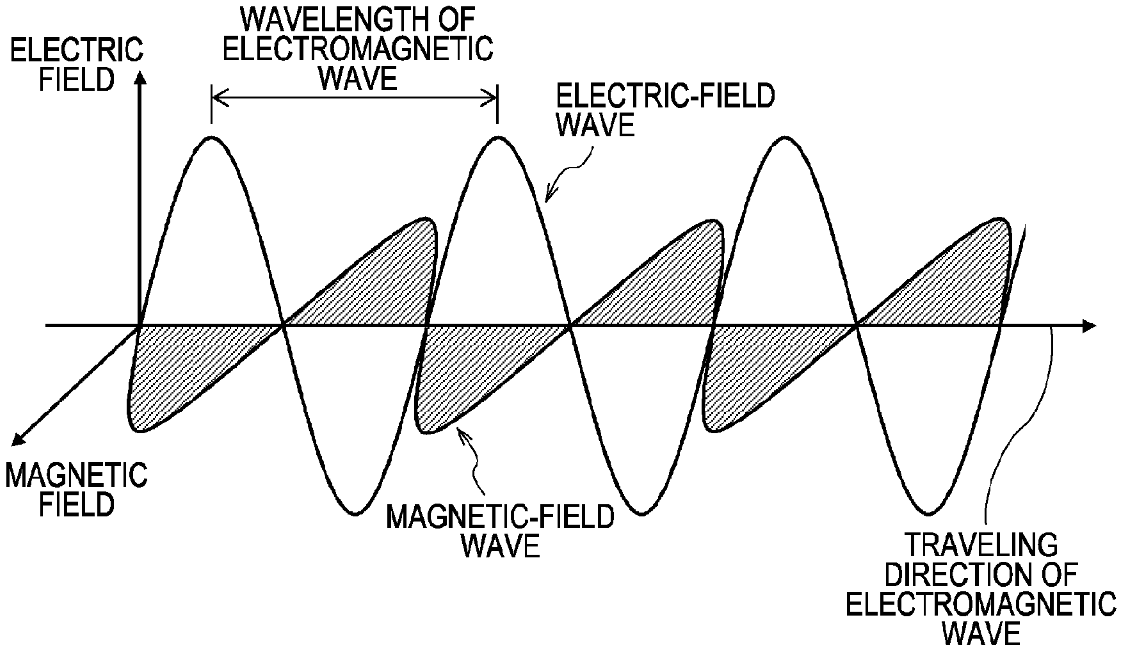
FIG. 20B schematically illustrates the state where an electromagnetic wave propagates from an antenna line.
Figure 21A:
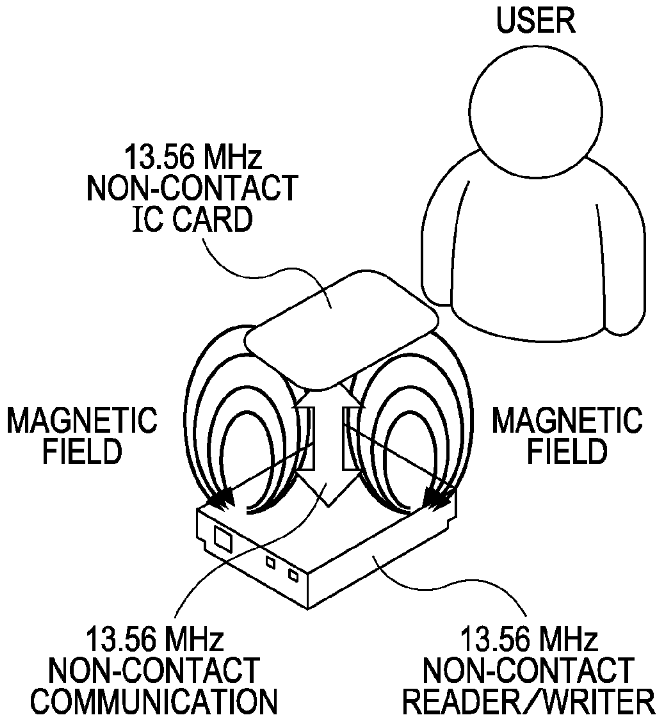
FIG. 21A illustrates a non-contact communication system using magnetic-field coupling.
Figure 21B:
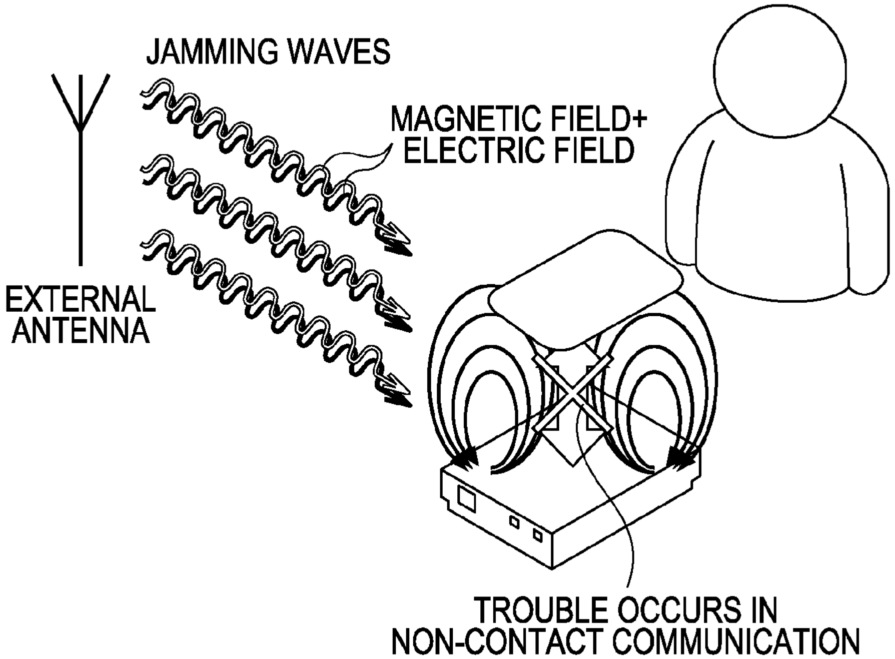
FIG. 21B illustrates the state where strong electric waves associated with external wireless communication or the like are incident to the non-contact communication system using magnetic-field coupling.
Figure 22:
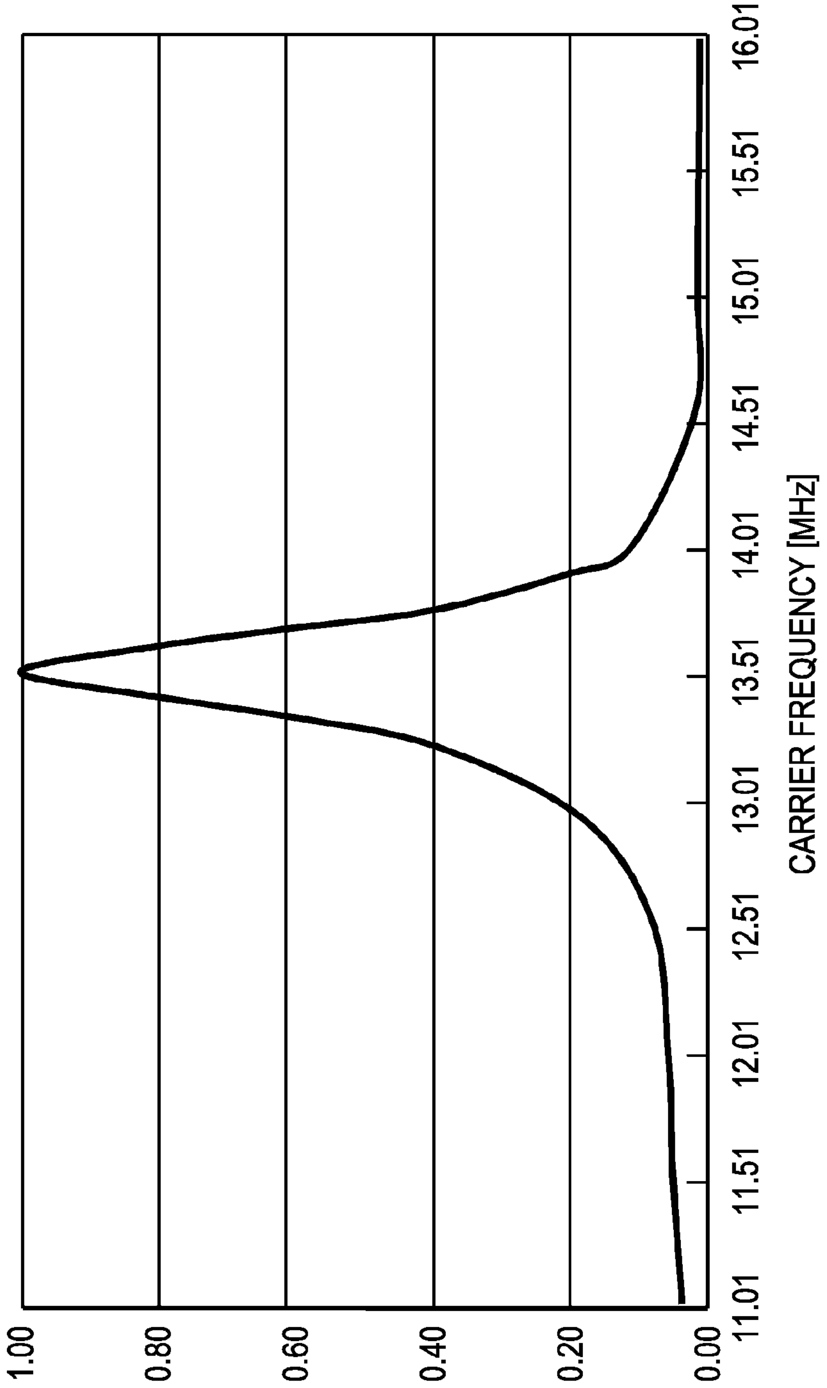
FIG. 22 illustrates a frequency resonance characteristic of a non-contact communication system using 13.56 MHz in the past.
Figure 23:
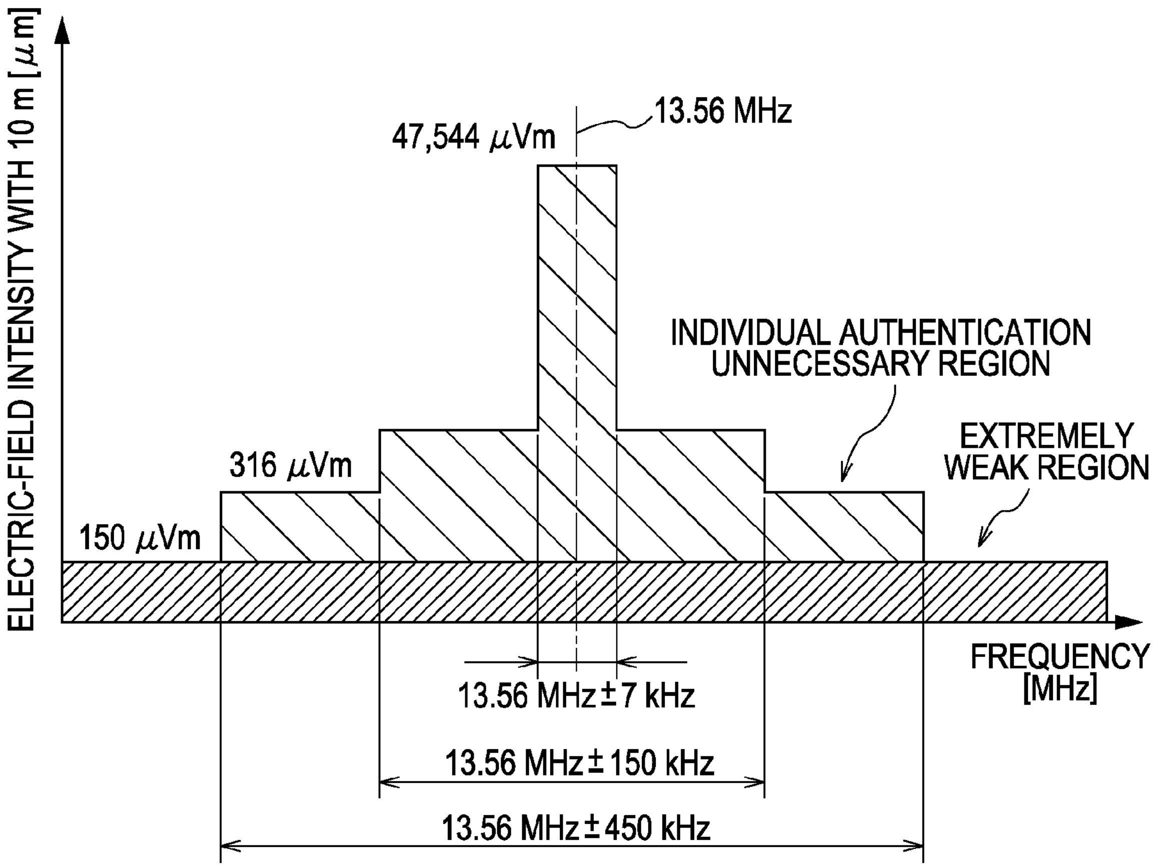
FIG. 23 illustrates regulations for an output electric-wave intensity in a non-contact communication system (inductive read/write communication equipment) using 13.56 MHz stipulated in Ordinance for Enforcement of the Radio Law of Japan, Articles 44 and 46-2.
Figure 26:
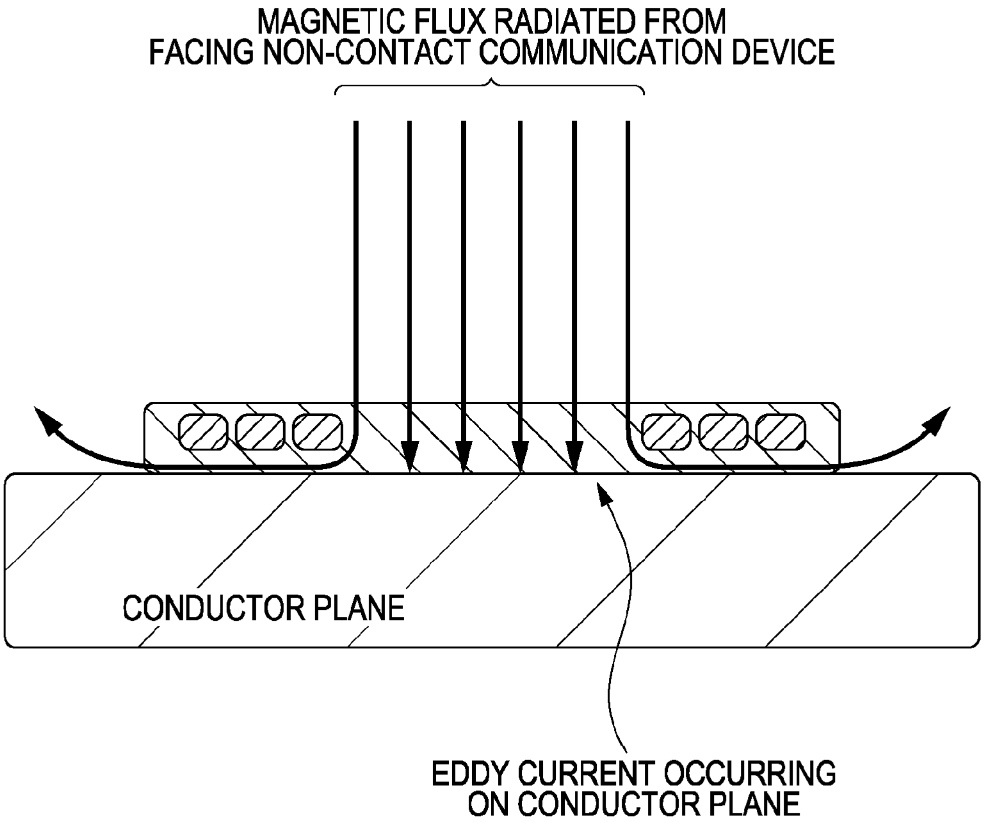
FIG. 26 illustrates the state where a magnetic flux is incident to a reception antenna depicted in FIG. 18.

FIG. 18 illustrates an antenna shape of a general NFC-compliant card. The depicted antenna has a structure in which a rectangular antenna coil is formed in an IC card shape along an outer periphery of the card to ensure power as large as possible. When this antenna for use in magnetic-field coupling is incorporated in a portable phone, a mobile communication device, or other small information devices, metal components including a battery pack are implemented at high density in a housing. Therefore, it is assumed that the antenna is disposed near a metal surface. In this case, an eddy current occurs on the metal surface. With a reversed magnetic field due to this eddy current, an original magnetic field for use in communication is inhibited to invite a deterioration in communication characteristic. FIG. 26 illustrates the state where a magnetic flux is incident to a reception-side antenna. When such a magnetic field regarding a conductor plane, such as a metal component, is changed, an eddy current occurs in the conductor due to electromagnetic induction.

Figure 27:
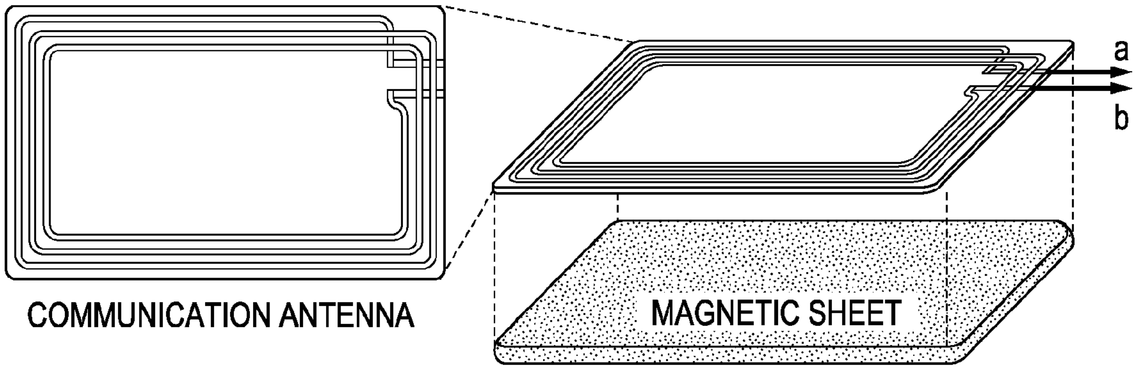
FIG. 27 illustrates the state where a magnetic sheet is interposed between a loop antenna and a metal surface.
Figure 28:
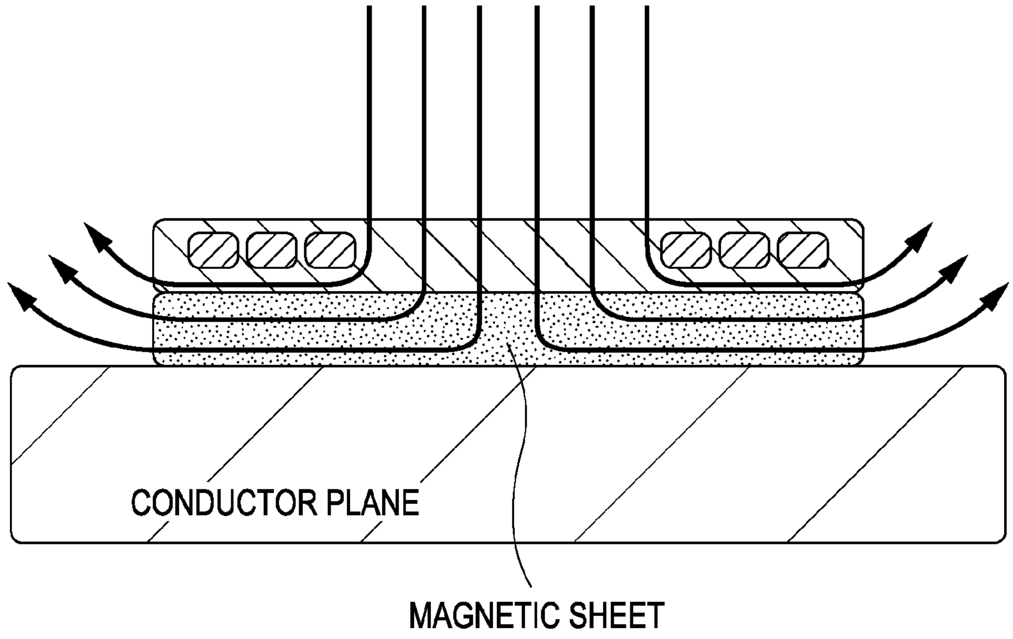
FIG. 28 illustrates the state where a magnetic flux incident to a reception-side antenna passes through the magnetic sheet to outside.
Figure 29:
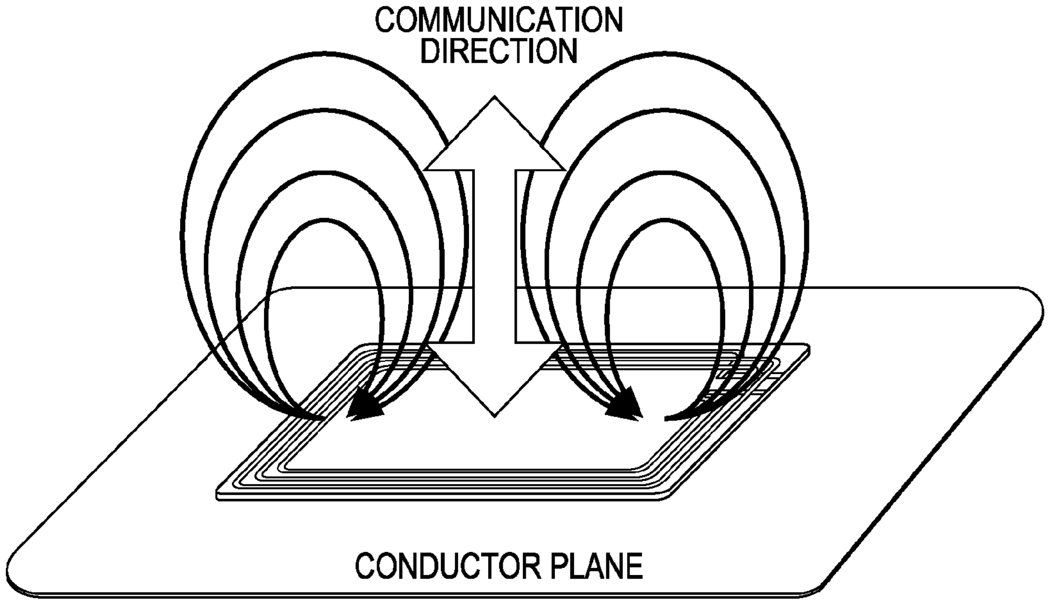
FIG. 29 illustrates the state where magnetic fields occurring on both of upper and lower sides of an antenna surface are divided by a conductor plane.

To prevent the occurrence of an eddy current on the metal surface nearby, a technique is taken in which a magnetic sheet for absorbing electric waves is provided on an opposite side of an antenna surface with respect to a communication direction (for example, refer to Japanese Unexamined Patent Application Publications Nos. 2004-153463, 2004-166176, and 2006-5836). FIG. 27 illustrates the state where a magnetic sheet is interposed between a loop antenna and a metal surface. In this case, as depicted in FIG. 28, a magnetic flux incident to a reception-side antenna can pass through the magnetic sheet to outside. In other words, no magnetic field is applied to the conductor plane, and therefore no eddy current occurs. Here, on a transmission-side antenna, although magnetic fields are originally supposed to occur on both upper and lower sides of the antenna surface, a magnetic field occurs only on an upper side as depicted in FIG. 29 because the upper and lower magnetic fields are divided by a conductor plane. Antenna terminals a and b in FIG. 27 are connected to a communication circuit (not shown).

Also, in the field of wireless technology, a shielded loop antenna formed of a microloop made of a coaxial line is used. The shielded loop antenna has a characteristic of having an utmost minimum sensitivity to electric-field components of electric waves (disturbance) and having only a sensitivity to magnetic-field components, and has been widely used for a magnetic-field probe antenna and portable wireless devices including amateur wireless devices. A communication device with a shielded loop antenna removes domestic noise (electrostatic magnetic field) and receives a magnetic-field component of a signal (radiated electromagnetic field) to be originally received from a far distance.

Figure 24:
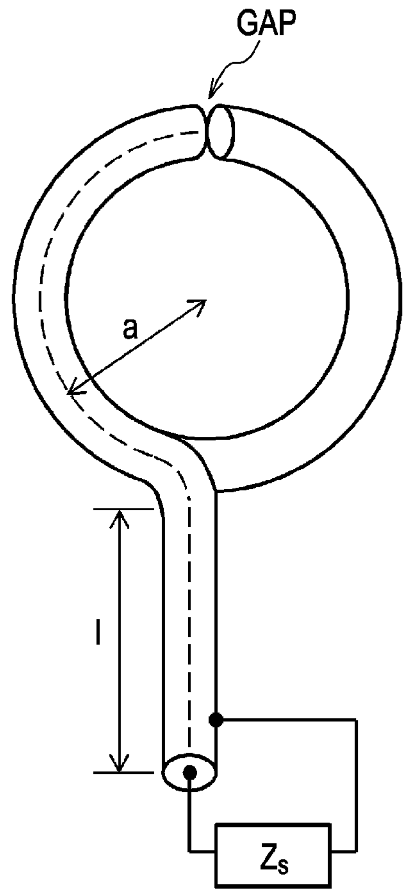
FIG. 24 illustrates an example of the structure of a shielded loop antenna.
Figure 25:
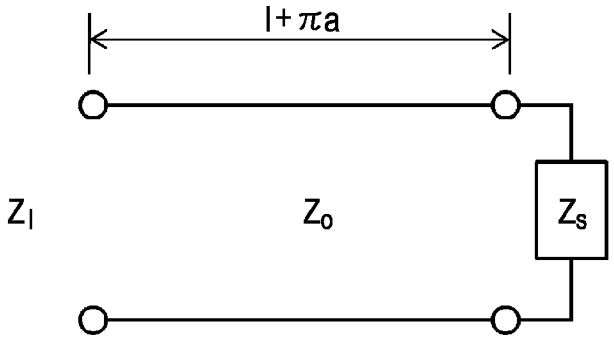
FIG. 25 illustrates an equivalent circuit of the shielded loop antenna depicted in FIG. 24.

FIG. 24 illustrates an example of the structure of a shielded loop antenna. FIG. 25 illustrates an equivalent circuit of the shielded loop antenna depicted in FIG. 24. For a shielded loop, a conductor having a radius a is formed of a coaxial line, and its core wire is partially drawn to be connected to a conductor to form a gap. An electromotive force occurring in this gap is transferred via the coaxial line having a length of $1+\pi a$ to be coupled to an impedance $Z_s$. Therefore, an impedance $Z_1$ of the gap is found as an impedance $Z_o$ of the coaxial line from the equivalent circuit depicted in FIG. 25.

In the specification of this application, the inventors pay attention to a characteristic of receiving only a magnetic-field component and suggest application of a shielded loop antenna to a non-contact communication device for wide-band communication.

By using a shielded loop antenna, electric-field components of an electrostatic magnetic field and a radiation field unwanted in a non-contact communication system of an electromagnetic inductance type can be shielded for suitable communication using an inductive electromagnetic field.

Figure 1A:
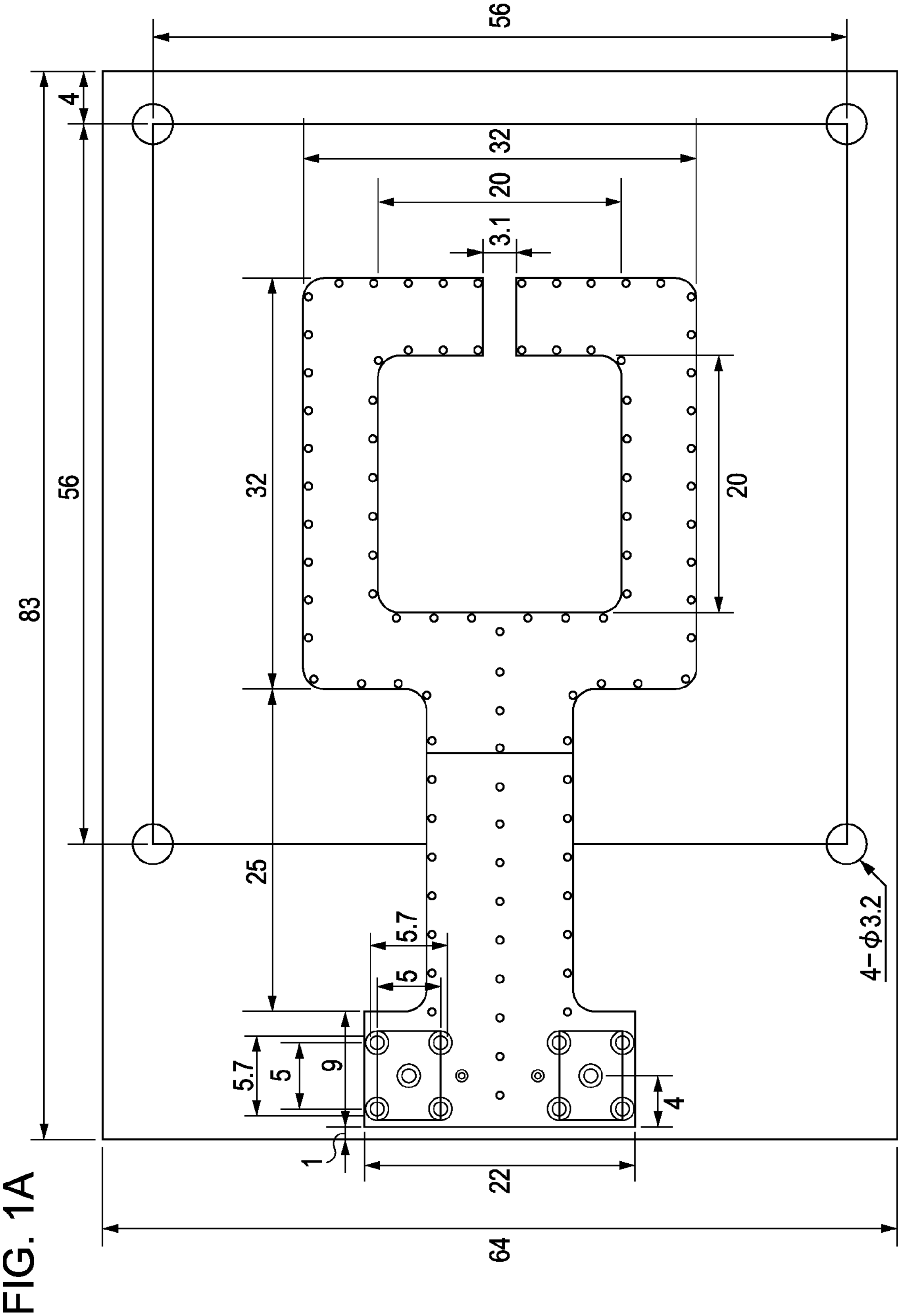
FIG. 1A illustrates an example of the structure of a shielded loop antenna with a layered structure formed on a single substrate and, specifically, a component surface formed of a shielding portion.
Figure 1B:
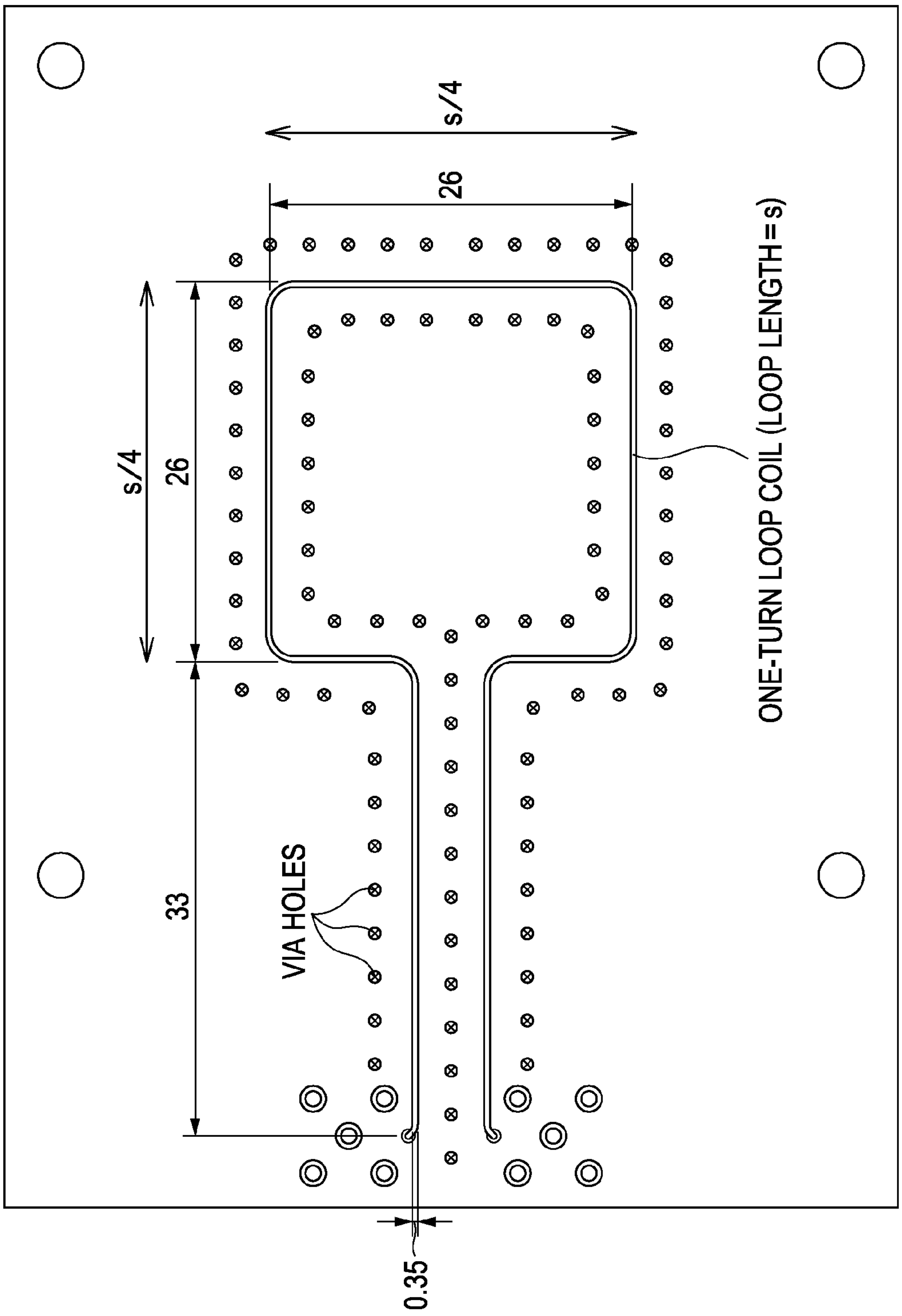
FIG. 1B illustrates an example of the structure of a shielded loop antenna with a layered structure formed on a single substrate and, specifically, a the surface on which a one-turn loop coil is implemented.
Figure 1C:
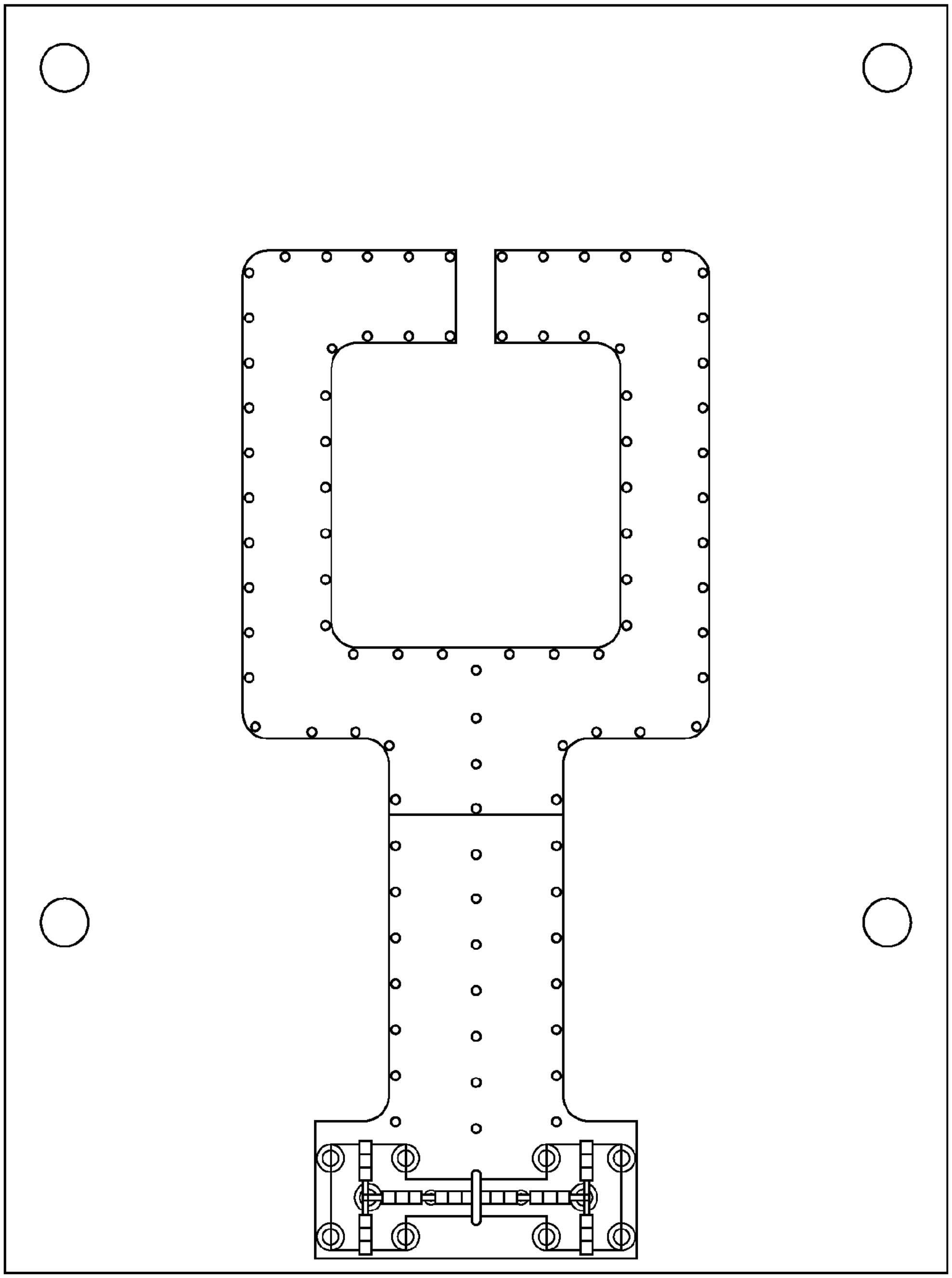
FIG. 1C illustrates an example of the structure of a shielded loop antenna with a layered structure formed on a single substrate and, specifically, a solder surface formed of a shielding portion.
Figure 1D:
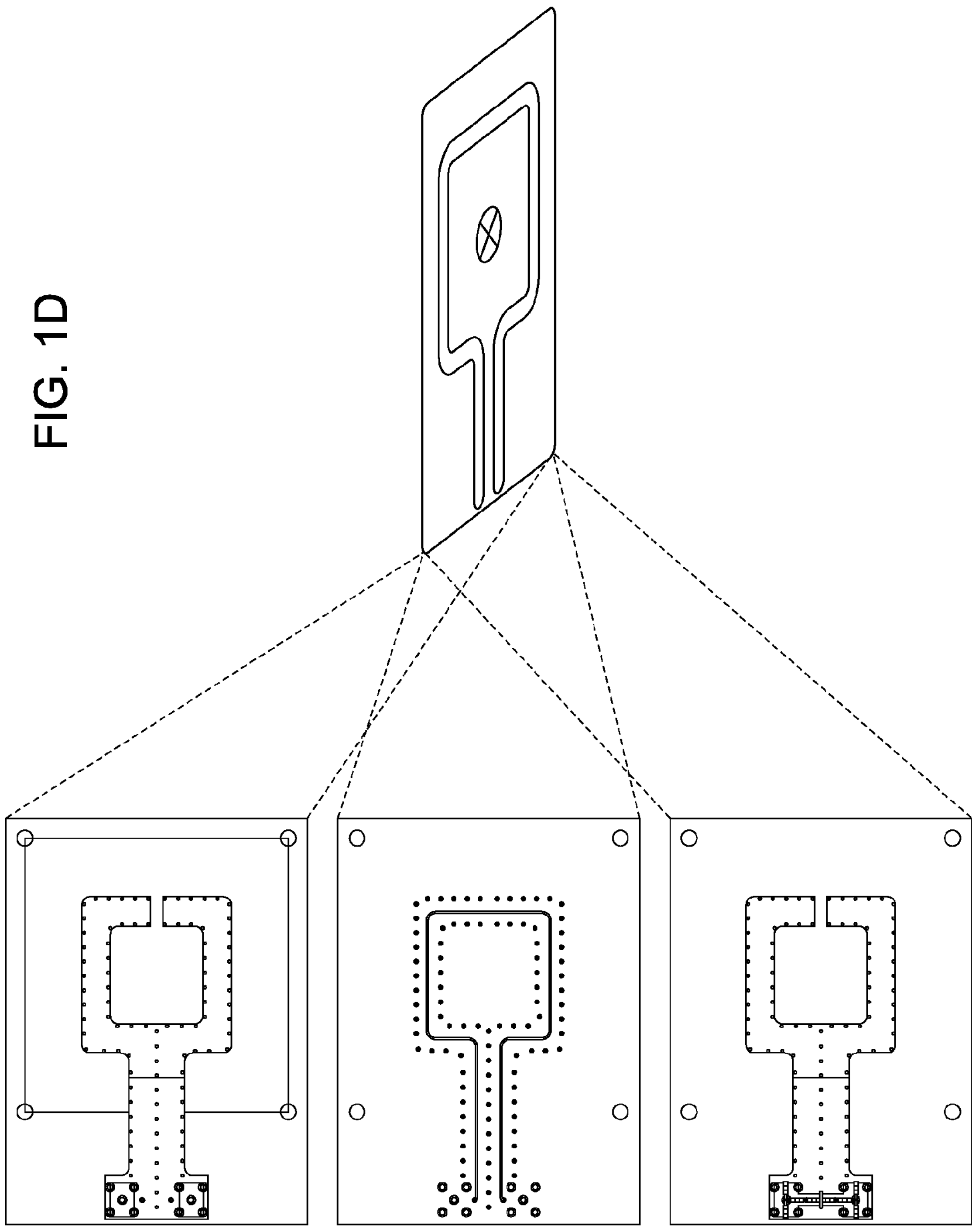
FIG. 1D illustrates an example of the structure of a shielded loop antenna with a layered structure formed on a single substrate.

A shielded loop antenna can be formed with, for example, a layered structure, on a single substrate. FIGS. 1A to 1D illustrate examples of the structure of a shielded loop antenna with a layered structure formed on a single substrate. In the depicted examples, an inner-layer surface (refer to FIG. 1B) on which a one-turn loop coil having a loop length s is implemented is laminated so as to be interposed between a component surface (refer to FIG. 1A) and a solder surface (refer to FIG. 1C) each having a shielding portion to form a single substrate as depicted in FIG. 1D. These layers are conducted via via holes.

The inventors have confirmed through an experiment using the shield loop antenna depicted in FIG. 1D that data transfer can be made with a baseband of 454 Mbps in a shielded room.

Here, in a non-contact communication system at 13.56 MHz, an antenna has a strong frequency resonance characteristic with near 13.56 MHz as a peak. Therefore, the system is hardly affected by jamming waves in each frequency band used for many consumer wireless communications (as described above). By contrast, with an increase in communication rate, when wide-band baseband communication is performed without resonance, the system may be greatly affected by jamming waves from other consumer wireless communications.

In the experiment in the shielded room described above, a transmission antenna has an output value set according to the case (1) in which any application to the Ministry of Internal Affairs and Communications can be eliminated under the regulations in the Radio Law, that is, set to be within a leak electric-field intensity defined in an extremely-weak wireless station. However, when communication is performed outside of the shielded room, an error frequently occurs due to the influence of jamming waves, and it is difficult to use the system as a wireless communication device.

To get around this, in an embodiment of the present invention, in addition to a loop antenna performing original communication with magnetic-field coupling (referred to below as a communication antenna), another loop antenna is provided for removing jamming waves having the same opening structure but in an opposite loop direction (referred to below as a canceling antenna). With this, an antenna structure is applied in which an antenna, a magnetic sheet, a conductor plane (such as a metal component), a magnetic sheet, and an antenna are superposed in this order so that opening positions of two loop antennas are just superposed each other.

Figure 2:
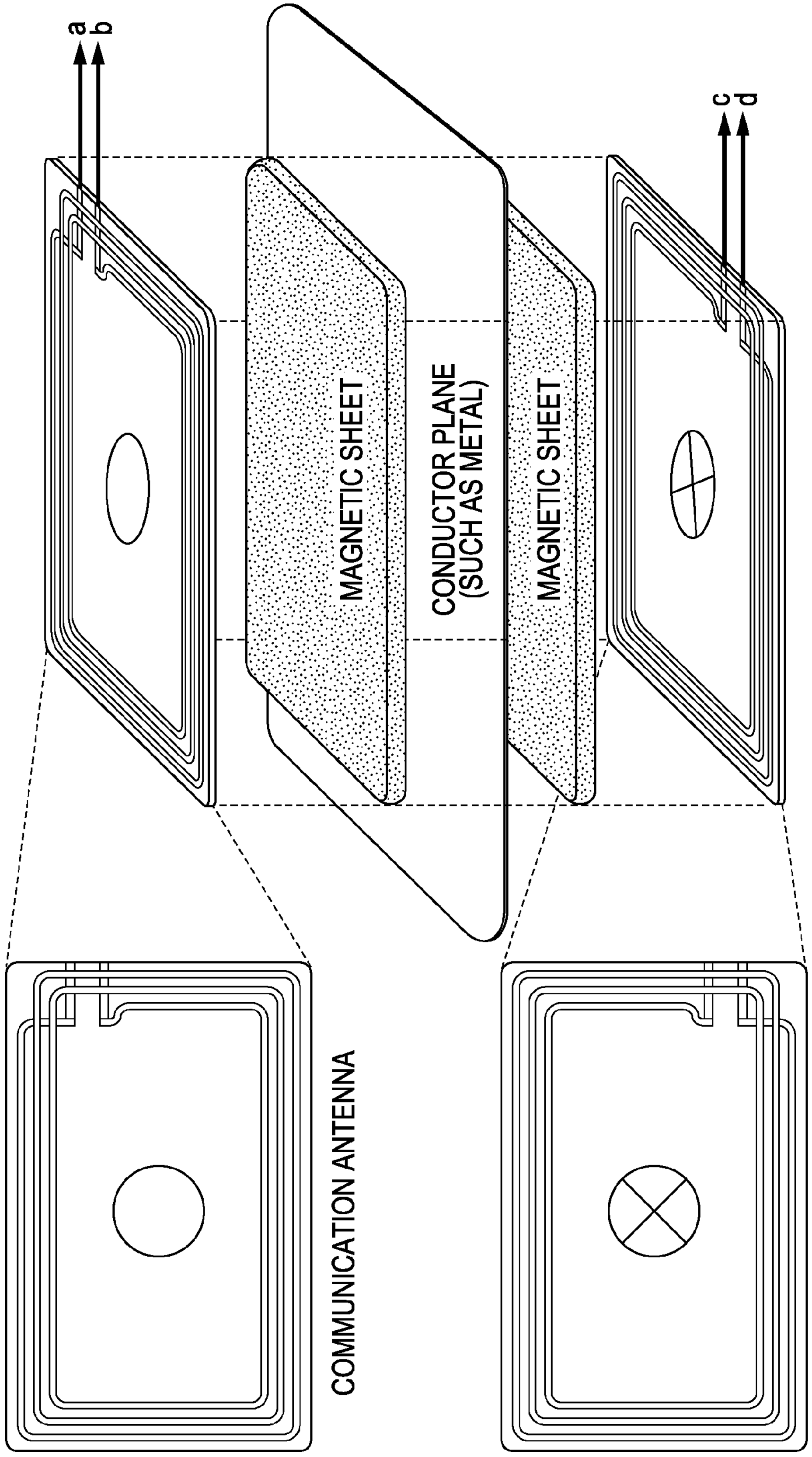
FIG. 2 illustrates an example of an antenna structure in which a communication antenna and a canceling antenna in opposite loop directions are disposed so that their opening positions of antenna loops are superposed each other.

FIG. 2 illustrates an example of antenna structure in which a communication antenna and a canceling antenna in opposite loop directions are disposed so that their opening positions of antenna loops are superposed each other. Terminals a to d of the respective antennas in FIG. 2 are connected to a communication circuit (not shown). The communication circuit increases an output electric-wave intensity in a non-contact communication system using a 13.56 MHz band in the past. Alternatively, the communication circuit performs wide-band baseband communication.

The magnetic sheets on both sides suppress the occurrence of an eddy current on the conductor plane, as described above. Also, the conductor plane plays a role of interrupting the interaction between the loop antennas on both upper and lower sides. To reliably play this role, the conductor is preferably sufficiently larger in area than the opening shape of each loop antenna and each magnetic sheet.

Figure 3:
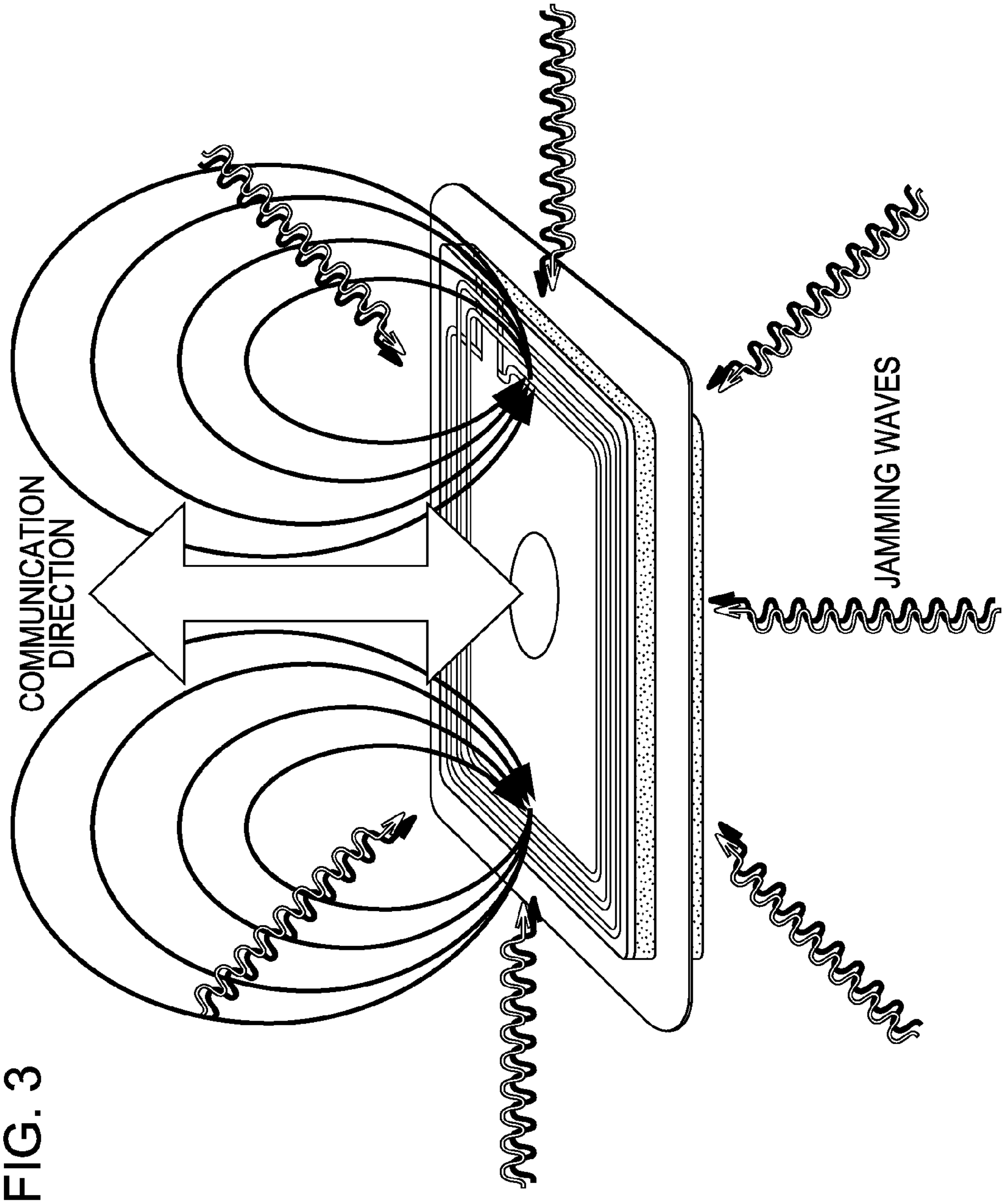
FIG. 3 illustrates the state where jamming waves are received from surroundings when the antennas depicted in FIG. 2 perform communication using magnetic-field coupling.

FIG. 3 illustrates the state where jamming waves are received from surroundings when the antennas depicted in FIG. 2 perform communication using magnetic-field coupling. The communication antenna and the canceling antenna are vertically symmetrical with respect to the conductor plane, and therefore have an equivalent reception characteristic with respect to electric waves incident from an antenna-surface horizontal direction. Here, the communication antenna and the canceling antenna have antennal loop in opposite directions, and therefore components in the antenna-surface horizontal direction of the incident electric waves are just cancelled out each other in the communication circuit. In non-contact communication, in consideration of communication with respective loop antennas of an initiator and a transponder facing each other with respect to an antenna-surface vertical direction, the components in the antenna-surface horizontal direction of the electric waves are none other than components of jamming waves. Therefore, according to the embodiment of the present invention, the components of jamming waves received by the communication antenna are canceled out with the components of jamming waves received by the canceling antenna.

In the most simple technique of fabricating an antenna depicted in FIG. 2, two magnetic-sheet-attached antennas each having an opening shape (such as a rectangle) vertically and horizontally symmetrical to each other (refer to FIGS. 27 and 28) are provided, and then they are turned over with a conductor plane interposed therebetween. Here, these magnetic-sheet-attached antennas have an equal relation with each other, and predefinition of either one of them for communication and the other for canceling can be eliminated. When communication is performed with one of the antennas, the other antenna operates a canceling antenna by itself.

Next, a technique of connecting a communication antenna and a canceling antenna to a communication circuit is studied.

Figure 4:
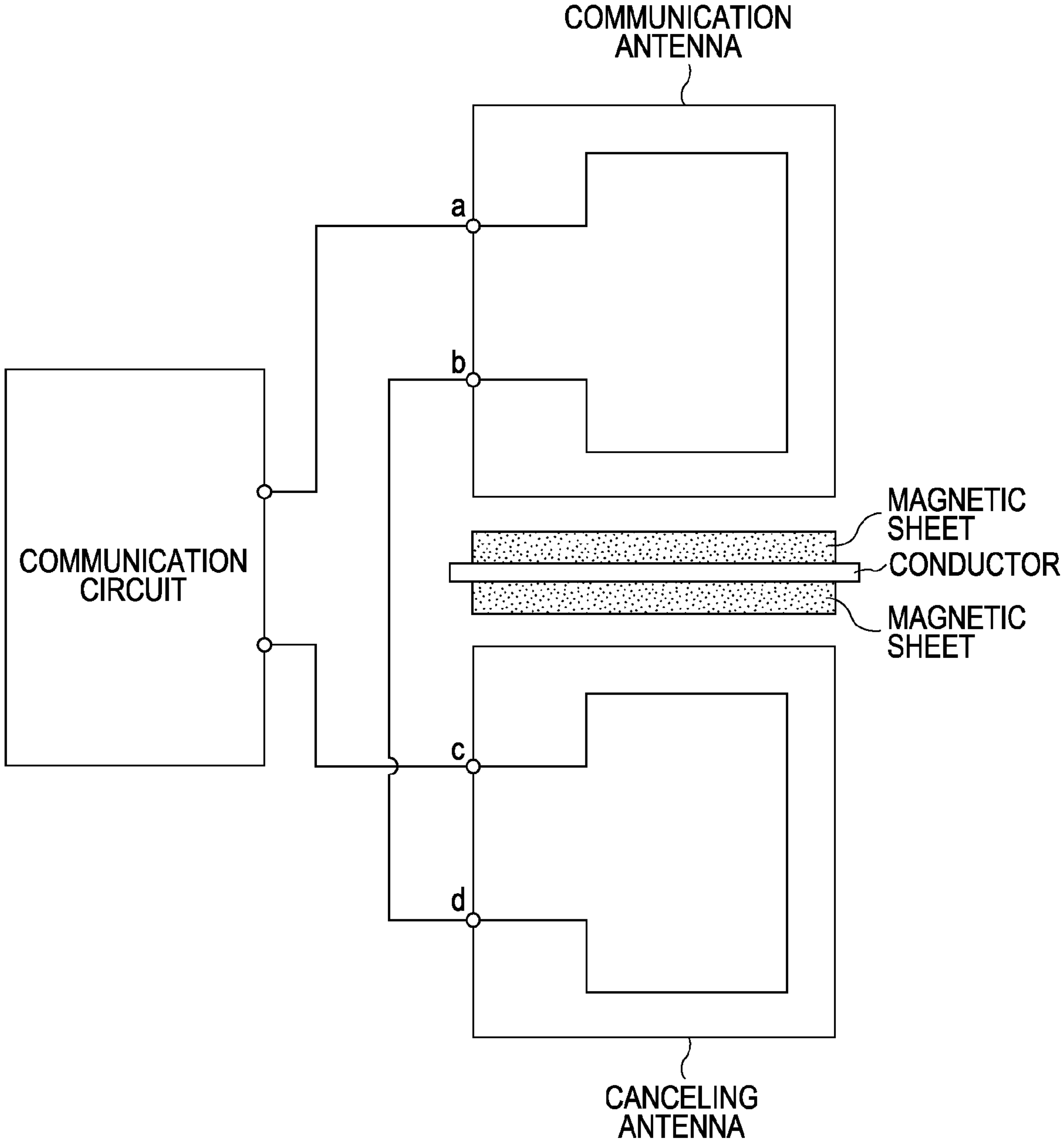
FIG. 4 illustrates an example of the structure of an antenna device with two loop antennas connected in series.

In an application to a non-contact communication system using a 13.56 MHz band, it seems preferable to connect two loop antennas in series, as depicted in FIG. 4. This is because, since the loop antennas have a steep frequency characteristic, when the impedance is degraded due to the start of non-contact communication at one loop antenna, the canceling effect is disadvantageously decreased.

Note that a maximum canceling effect can be obtained when high-frequency currents flowing through both loop antennas of the communication antenna and the canceling antenna are in phase with each other. As depicted in FIG. 4, when two loop antennas are connected in series, due to propagation delay between the antenna loops, a shift in waveform phase may occur therebetween. While 13.56 MHz is converted to approximately 22 m in wavelength, an antenna loop length obtained by summing these two loop antennas is several tens of cm at best. Moreover, since only the components near a carrier frequency of 13.56 MHz are used for communication, the shift in phase hardly has an influence.

The inventors have confirmed effectiveness of the embodiments of the present invention over non-contact communication using a 13.56 MHz band in the past by measuring leak power of the antenna device in which two loop antennas are connected in series (refer to FIG. 4). Details are described further below.

Figure 5:
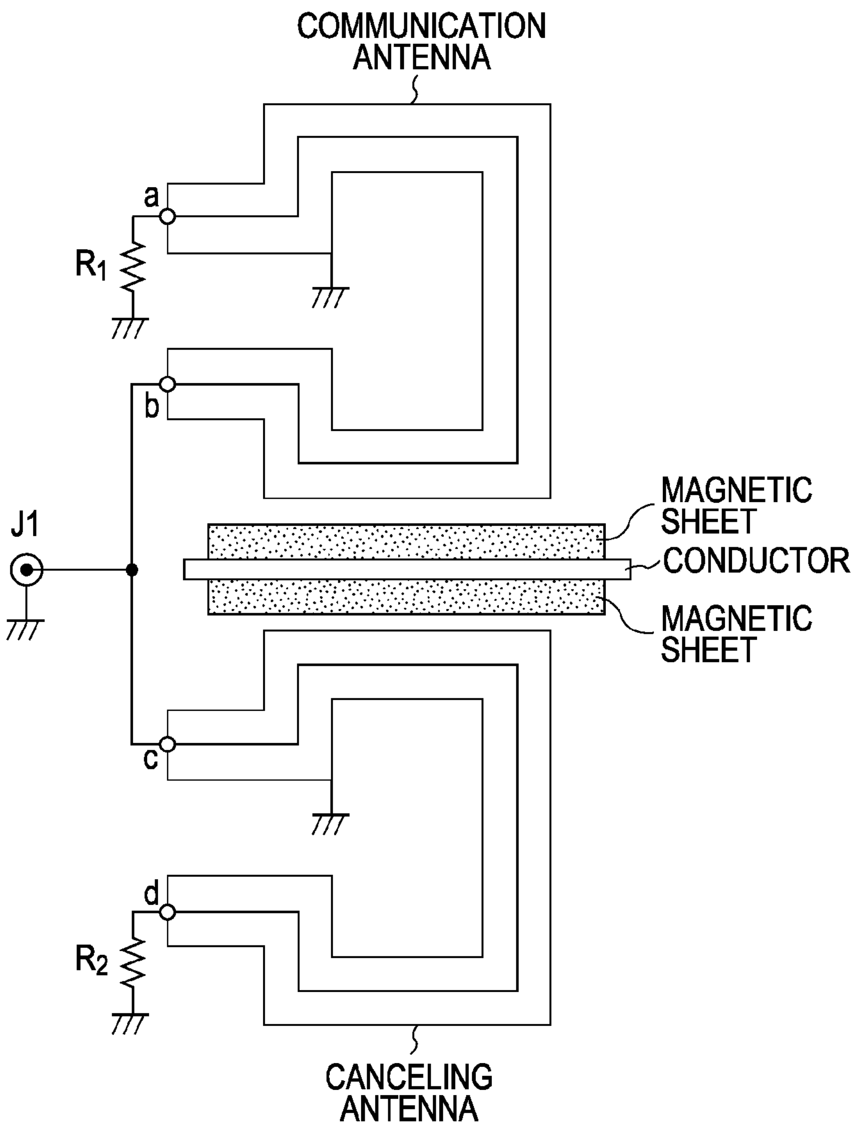
FIG. 5 illustrates an example of the structure of an antenna device with two loop antennas connected in parallel.

By contrast, for wide-band baseband communication, as depicted in FIG. 5, it is assumed that two loop antennas are preferably connected in parallel. In this case, however, shielded loop antennas are used as loop antennas, as described above.

In wide-band communication, since the frequency characteristic is flat, the impedance is not greatly degraded even with non-contact communication using one loop antenna, and therefore the canceling effect is not decreased due to impedance degradation. From this point of view, a pair of loop antennas may not be connected in series to the communication circuit. Rather, when two loop antennas are connected in series, due to propagation delay between the antenna loops, it is difficult to neglect a phase shift in waveform therebetween. Moreover, since wide frequency components are used for communication, the influence of the phase shift is increased. For example, 300 MHz is converted to 1 m in wavelength, which is difficult to neglect with respect to a total antenna loop length.

The inventors have confirmed through actual measurements that, in wide-band baseband communication, the canceling effect is degraded when two loop antennas are connected in series and the use of these antennas is significantly impaired. The inventors have also confirmed the effectiveness of the embodiments of the present invention for wide-band baseband communication by measuring an effect of suppressing jamming waves received from surroundings in the antenna device in which two loop antennas are connected in parallel (refer to FIG. 5), which will be described in detail further below.

Next, the reception sensitivity characteristic of the antenna device according to the embodiments of the present invention with respect to electric waves incident from a far distance is described.

In the case of the magnetic-sheet-attached loop antenna depicted in FIGS. 27 and 28, the highest reception sensitivity to electric waves incident from outside has been demonstrated in a horizontal direction with respect to the antenna surface.

Also, as depicted in FIG. 2, the antenna device according to the embodiments of the present invention has a structure in which two magnetic-sheet-attached loop antennas are disposed so as to be vertically symmetrical to each other with respect to the conductor plane. Therefore, the communication antenna and the canceling antenna have the same reception characteristic with respect to electric waves incident from an antenna-surface horizontal direction. Furthermore, each antenna has an antenna loop in an opposite direction to each other. Therefore, there is a canceling effect of just canceling components of the incident electric waves in the antenna-surface horizontal direction each other out at the time of processing a reception signal (refer to FIG. 3).

As a result of canceling, only the components in an antenna-surface vertical direction are detected among electric waves incident to the antenna device. Since the antenna sensitivity in a vertical direction is low, the signal level in the reception signal is extremely small.

On the other hand, when the antenna devices depicted in FIG. 2 face each other within a short distance, the magnetic field radiated from the communication antenna on a transmission side in an antenna-surface vertical direction can be received by the communication antenna on a reception side, but is hardly input to a canceling-antenna side interrupted by the conductor plane. Therefore, the components of the incident electric waves in the antenna-surface vertical direction are not cancelled at the time of processing the reception signal, and can be detected as they are as a reception signal.

From the description above, according to the antenna device depicted in FIG. 2, it can be understood that resistance to jamming waves incident from a far distance can be increased without affecting the performance of non-contact communication using magnetic-field coupling.

Figure 6:
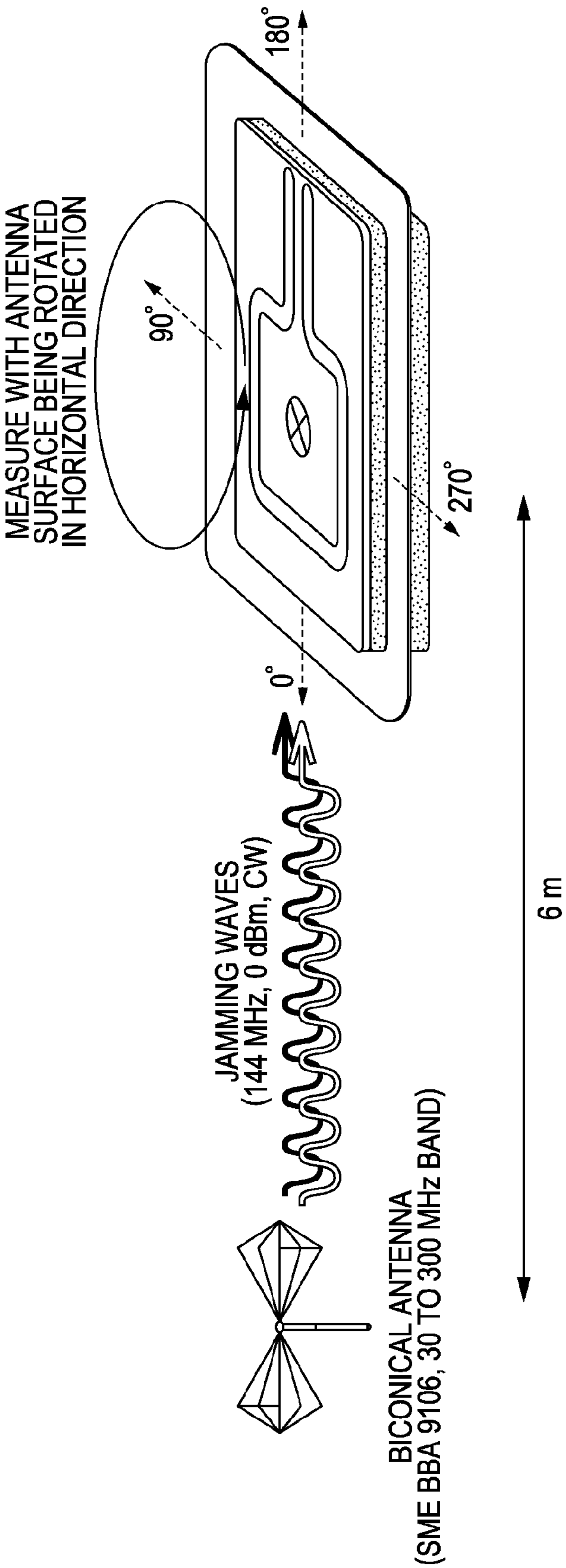
FIG. 6 illustrates a technique of measuring a jamming-wave suppressing effect of an antenna device according to an embodiment of the present invention (refer to FIG. 4)

FIG. 6 illustrates a technique of measuring a jamming-wave suppressing effect of the antenna device according to an embodiment of the present invention. As depicted, in a shielded room, a biconical antenna (SME BBA 9106, 30 to 300 MHz band) as a source of generating jamming waves and an antenna device to be measured are disposed so as to be 6 m away from each other. Then, the antenna device is placed on a turntable. While the orientation in an antenna-surface horizontal direction for receiving jamming waves from the biconical antenna is being rotated by 15 degrees for 360 degrees, the reception signal intensity of a CW signal at 144 MHz and 0 dBm radiated from the biconical antenna is measured.

Here, the antenna device for measurement of the reception signal intensity is an antenna device for wide-band baseband communication in which two magnetic-sheet-attached shielded loop antennas depicted in FIG. 5 are connected in parallel. As depicted in FIG. 2, these two loop antennas are disposed to be vertically symmetrical with respect to the conductor plane so that the opening positions of the antenna loops in opposite directions are superposed each other. In an experiment, a plurality of types of measurement were performed with the opening area of each antenna loop being varied. One of the loop antennas disposed to be vertically symmetrical operates as a communication antenna, and the other operates as a canceling antenna suppressing jamming waves.

Figure 7:
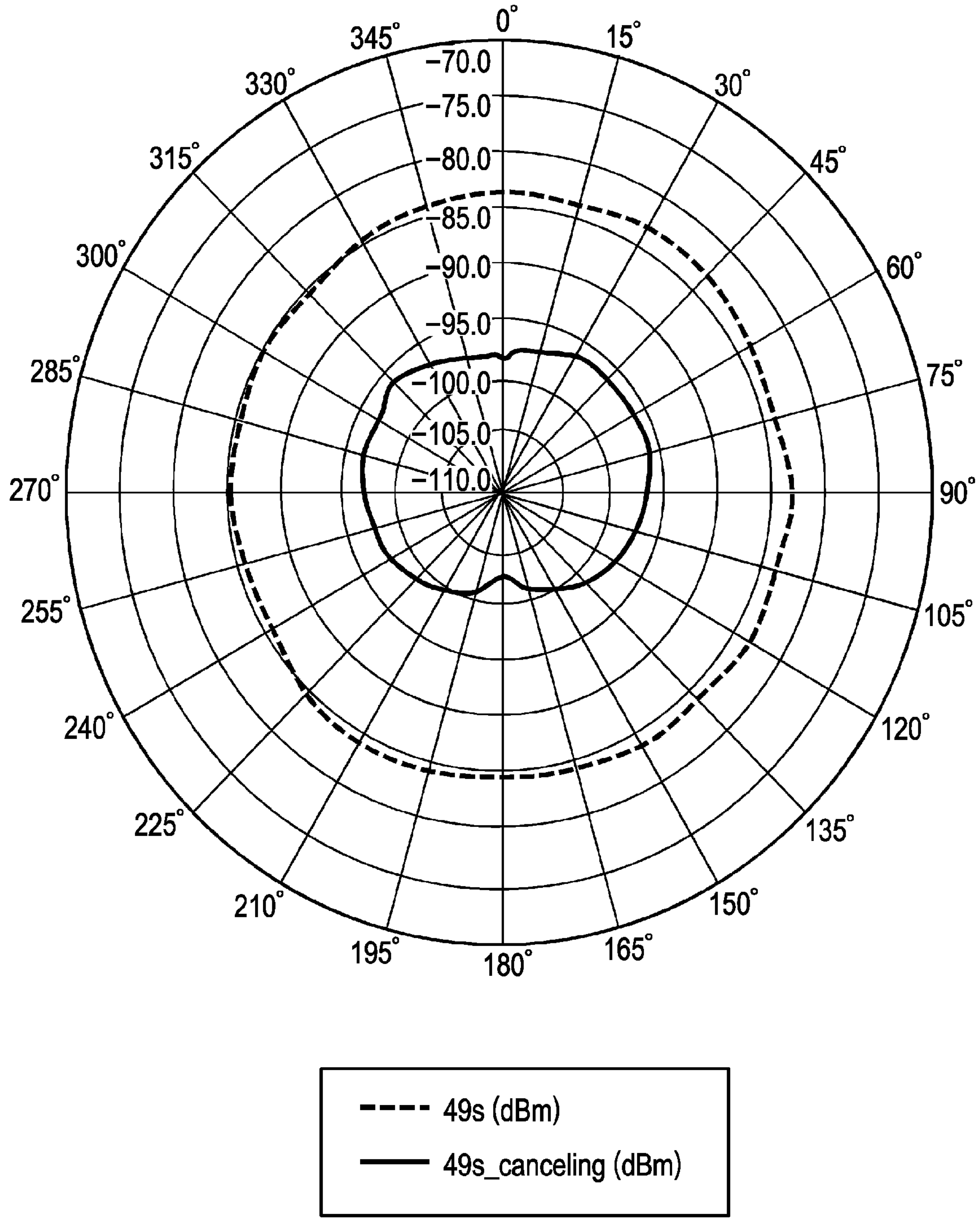
FIG. 7 illustrates measurement results of the jamming-wave suppressing effect of the antenna device according to the embodiment of the present invention (refer to FIG. 4) with the measuring technique depicted in FIG. 6.
Figure 8:
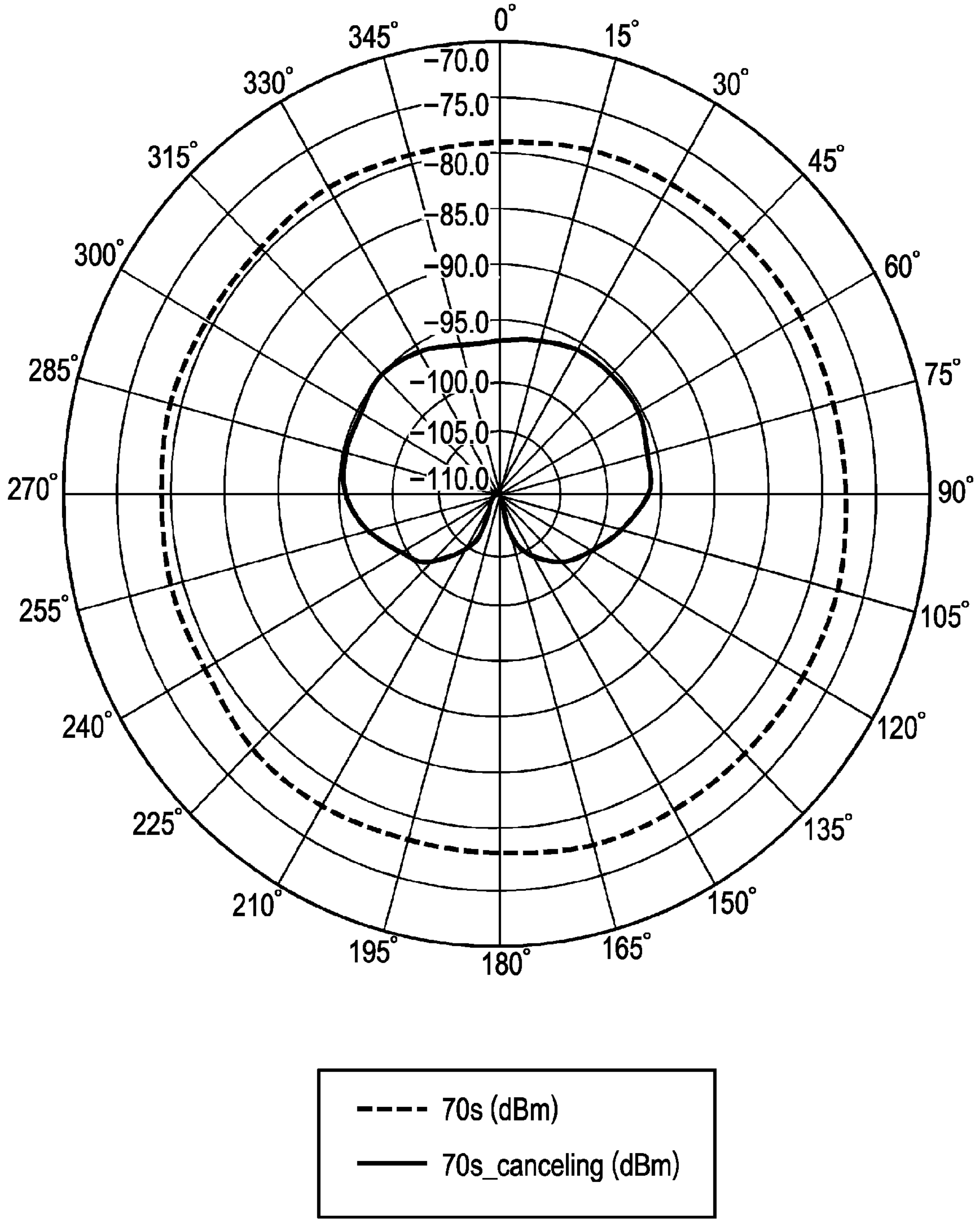
FIG. 8 illustrates measurement results of the jamming-wave suppressing effect of the antenna device according to the embodiment of the present invention (refer to FIG. 4) with the measuring technique depicted in FIG. 6.
Figure 9:
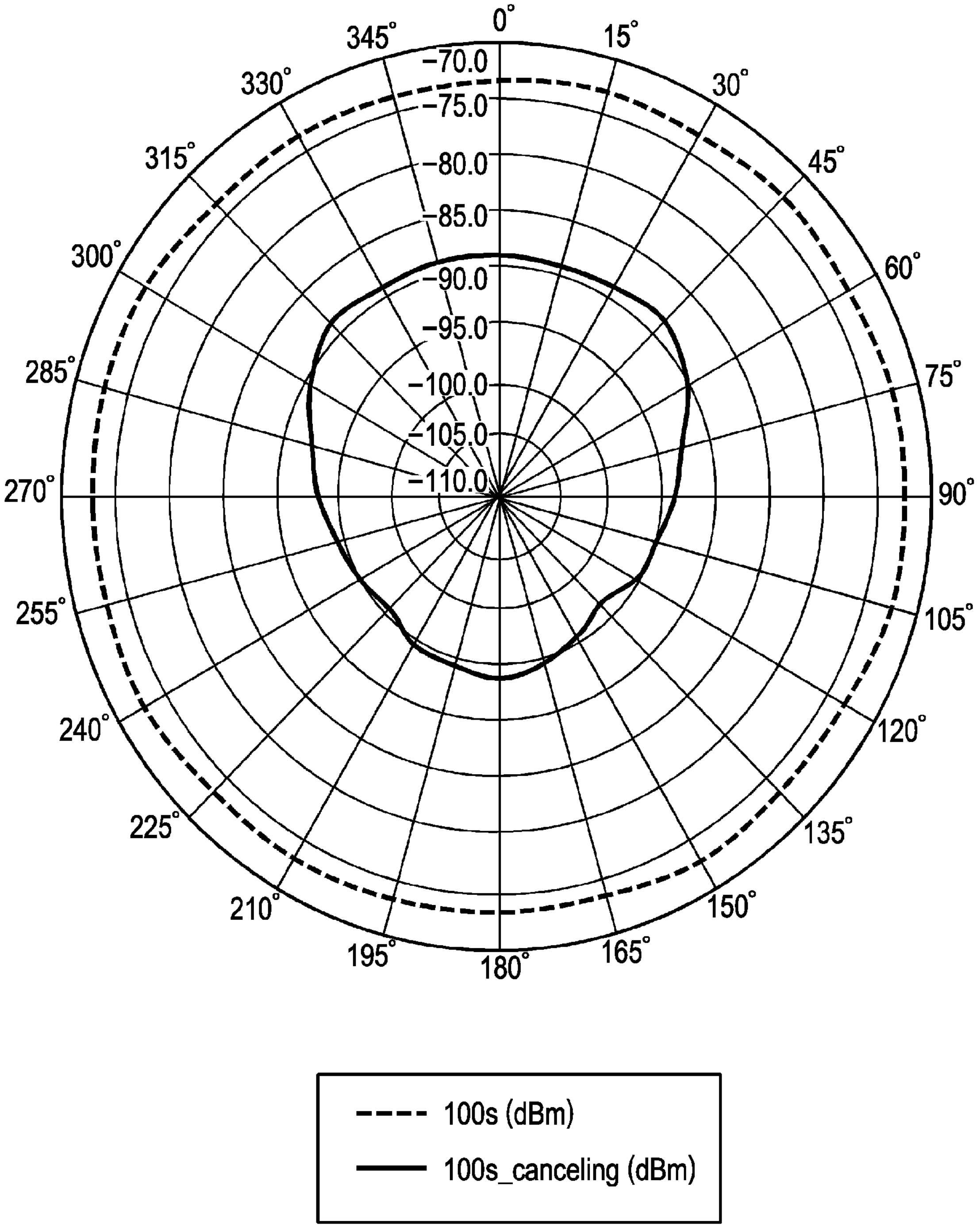
FIG. 9 illustrates measurement results of the jamming-wave suppressing effect of the antenna device according to the embodiment of the present invention (refer to FIG. 4) with the measuring technique depicted in FIG. 6.

FIGS. 7 to 9 are graphs of measurement results of the reception signal intensity for each opening area of the loop antenna of the antenna device depicted in FIG. 5 with the measuring technique depicted in FIG. 6. In each graph, the parameter s indicates a round length (in units of mm) of a square one-turn loop of the loop antenna. For example, 49 s represents a one-turn loop antenna having a round length of 49 mm. Also, data with canceling represents a measurement result of the antenna device depicted in FIG. 5 with a communication antenna and a canceling antenna in pair having the same opening shape, and data without canceling represents a measurement result of an antenna device formed of one shielded loop antenna.

With reference to each of the graphs in FIGS. 7 to 9, it can be found that the antenna devices with a canceling antenna depicted in FIG. 5 have a sufficient jamming-wave suppressing effect compared with antenna devices without a canceling antenna. In the graphs of the antenna devices with a canceling antenna, the measurement values fall in a direction near 180 degrees, possibly because no loop is present in the direction of 180 degrees and an antenna connector made of metal is disposed.

From the measurement results depicted in FIGS. 7 to 9, it seems to have confirmed that the antenna device in which two loop antennas are connected in parallel (refer to FIG. 5) is effective for wide-band baseband communication. It can be understood that the resistance to jamming waves in this case is increased to a practical level.

Next, the characteristic of electric waves radiated at the time of communication in the antenna device according to an embodiment of the present invention is described.

Electric waves radiated from a magnetic-sheet-attached loop antenna depicted in FIGS. 27 and 28 demonstrate the strongest characteristic in a horizontal direction with respect to the antenna surface, as is the case of reception sensitivity.

Figure 10:
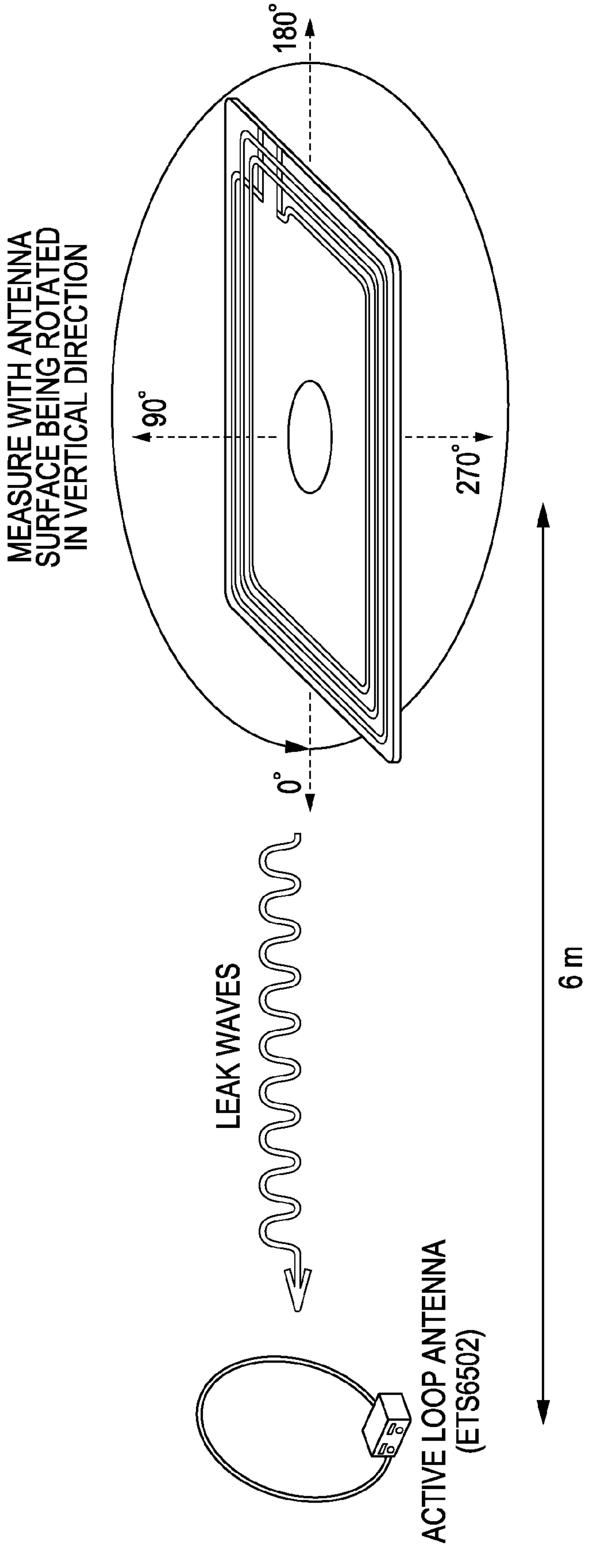
FIG. 10 illustrates a technique of measuring a leak wave of an antenna device including only a communication loop antenna.

FIG. 10 illustrates a technique of measuring a leak wave of an antenna device including only a communication loop antenna, in contrast to the embodiments of the present invention. As depicted, in a shielded room, an antenna device as a source of a leak wave and an active loop antenna (ETS6502) detecting an electric-field intensity of the leak wave are disposed so as to be 6 m away from each other. Then, the antenna device to be measured is placed on a turntable. While the orientation in an antenna-surface vertical direction with respect to a leak-wave propagation direction to the active loop antenna is being rotated by 15 degrees for 360 degrees, a carrier (13.56 MHz, CW) is discharged from the antenna device to be measured, and the electric-field intensity at the active loop antenna is measured. Here, to accurately measure the radiated electric field, a distance is typically half or longer than the wavelength λ (a little over 10 m at 13.56 MHz). However, in an experiment, the distance was 6 m due to the limitations of equipment available for the inventors (such as the space of the shielded room).

Here, the antenna device as a source of a leak wave is a Pasori antenna manufactured by Sony Corporation (45 mm×30 mm, only with a two-turn loop antenna, and without a drive circuit or a housing). This loop antenna is widely used mainly as a reader/writer in non-contact communication systems using 13.56 MHz in the past.

Figure 11:
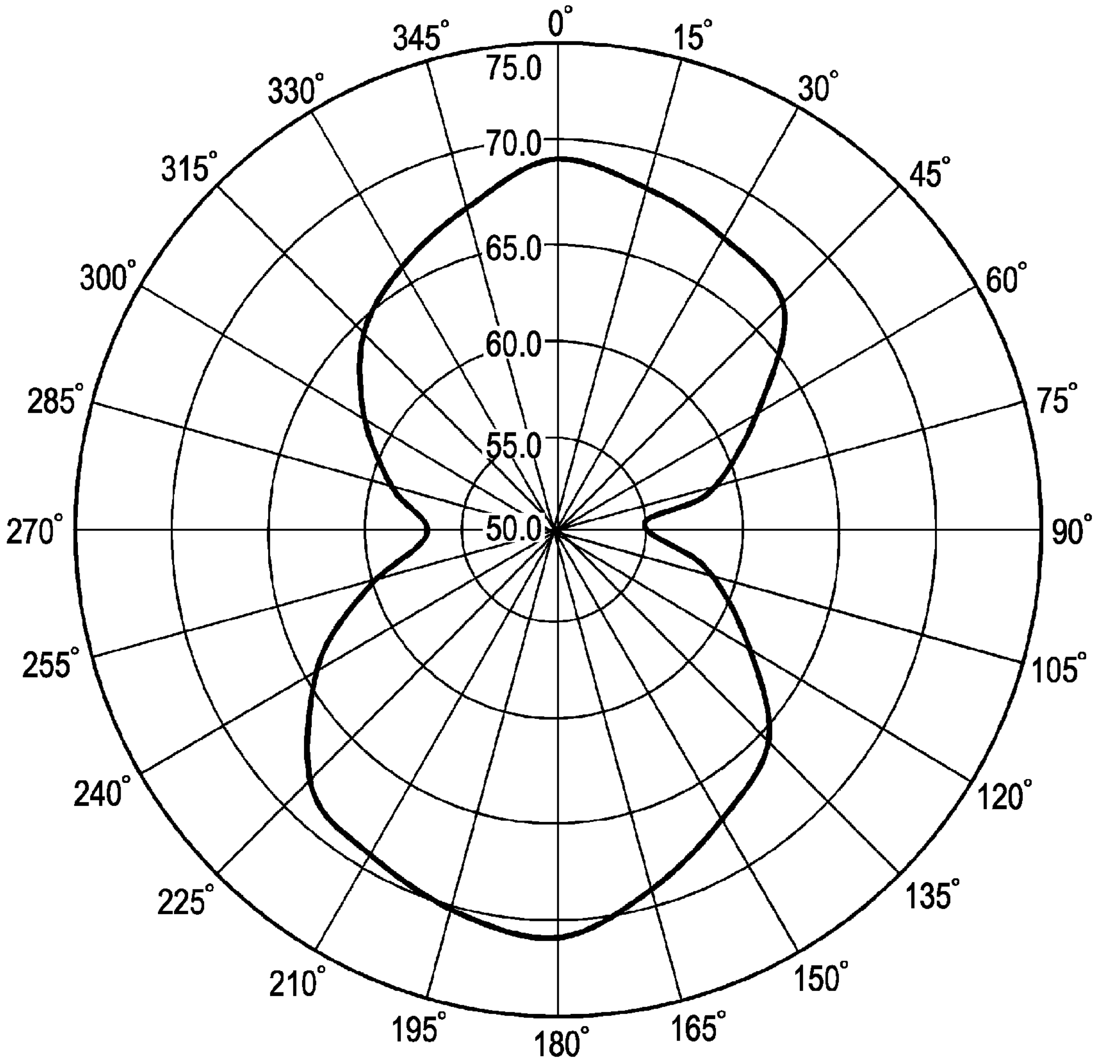
FIG. 11 illustrates measurement results of a leak wave of the antenna device including only a communication loop antenna (single Pasori antenna) based on the measuring technique depicted in FIG. 10.

FIG. 11 is a graph of measurement results of a leak wave of a reader/writer loop antenna in the past based on the measuring technique depicted in FIG. 10. Also from the actual measurements, it can be found that the strongest radiated electric field is demonstrated in an antenna-surface horizontal direction. When the output electric-wave intensity is increased to improve communication characteristics, a great concern may arise such that the radiated electric field in the antenna-surface horizontal direction becomes a jamming wave to peripheral systems.

Figure 12:
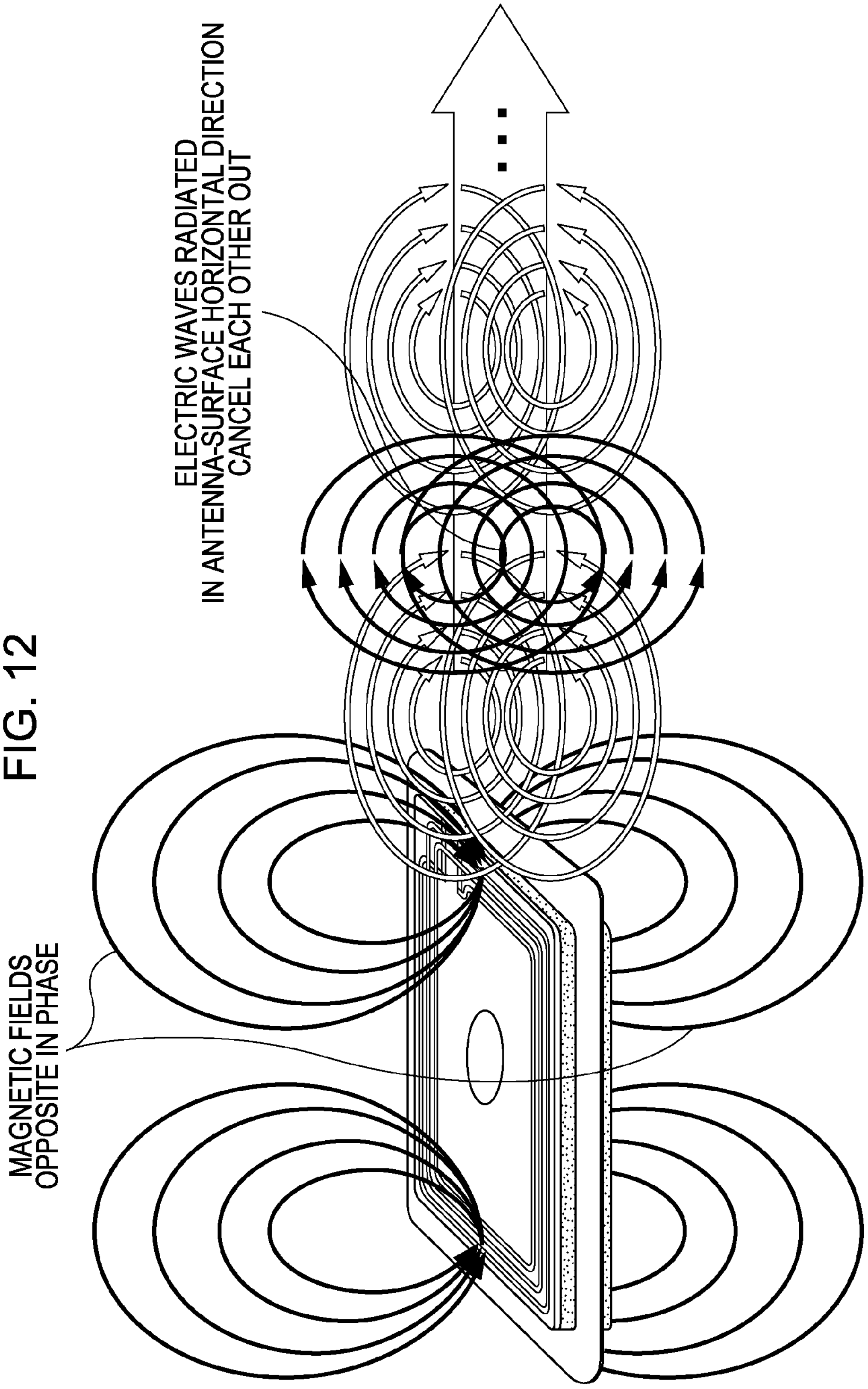
FIG. 12 illustrates the state of electric waves output from the antenna device according to the embodiment of the present invention (refer to FIG. 4)

The antenna device depicted in FIG. 4 according to an embodiment of the present invention is formed of a pair of loop antennas disposed so that these loop antennas are vertically symmetrical to each other. One of them operates as a communication antenna, and the other operates as a canceling antenna canceling leak waves. This is because, as depicted in FIG. 12, magnetic fields output from the communication antenna and the canceling antenna are opposite in phase, while electric waves radiated in the antenna-surface horizontal direction are cancelled each other out. As a result, among the electric fields radiated from the antenna device, only the components in an antenna-surface vertical direction are left, and the radiated electric field in the antenna-surface horizontal direction is suppressed. That is, the electric-field intensity of jamming waves concerned from the measurement results depicted in FIG. 11 is extremely small at a position of a far distance defined by the Radio Law (at a position 10 m away from the antenna).

By contrast, from both of the communication antenna and the canceling antenna, magnetic fields occur in the antenna-surface vertical direction, as depicted in FIG. 29. However, since the magnetic field output from the canceling antenna is interrupted by the conductor plane, the communication operation using magnetic-field coupling on the communication antenna side is hardly affected.

Furthermore, when the antenna device according to an embodiment of the present invention is applied to a communication system for supplying power with a carrier to a reception side simultaneously with data communication, an output of a strong electric field generates larger inductive power on the reception side. By rectifying this power, a larger drive power can be obtained.

Figure 13:
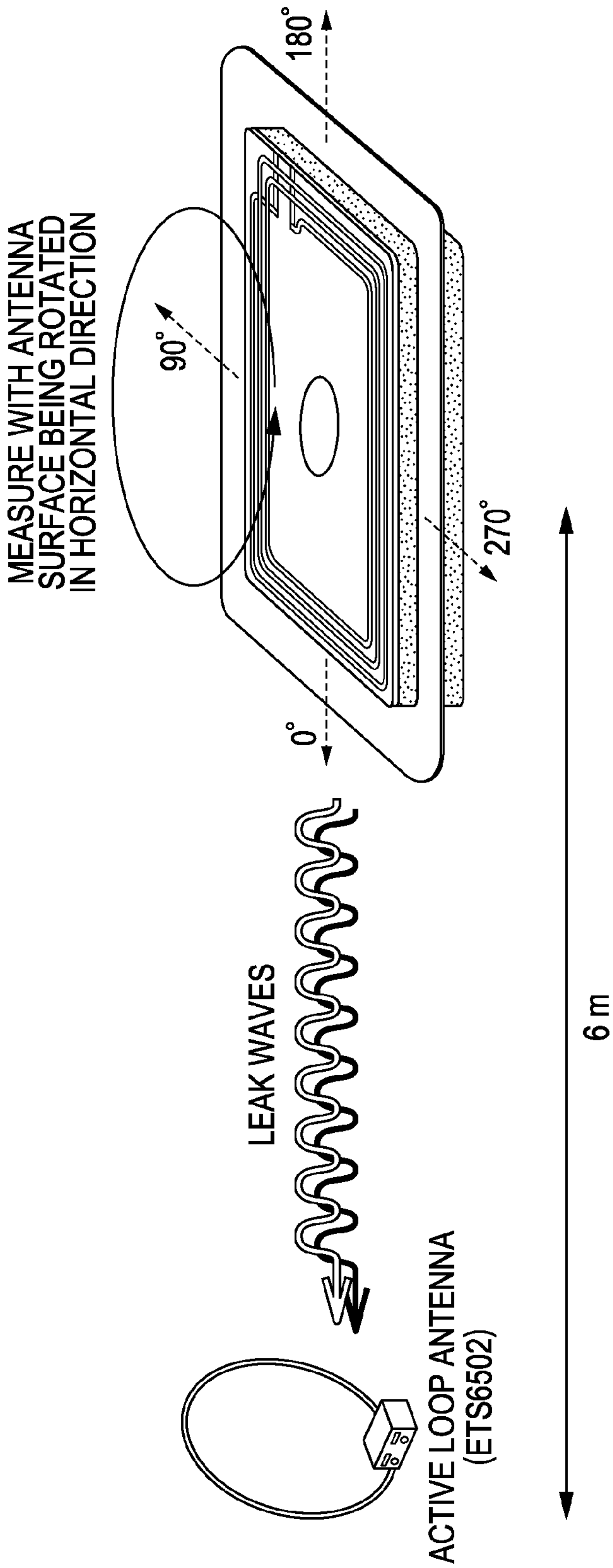
FIG. 13 illustrates a technique of measuring a leak wave in an antenna-surface horizontal direction from the antenna device according to the embodiment of the present invention (refer to FIG. 4)

FIG. 13 illustrates a technique of measuring a leak wave of the antenna device according to an embodiment of the present invention. As depicted, in a shielded room, an antenna device as a source of a leak wave and an active loop antenna (ETS6502) detecting an electric-field intensity of the leak wave are disposed so as to be 6 m away from each other. Then, the antenna device to be measured is placed on a turntable. While the orientation in an antenna-surface horizontal direction with respect to a leak-wave propagation direction to the active loop antenna is being rotated by 15 degrees for 360 degrees, a carrier (13.56 MHz, CW) is discharged from the antenna device to be measured, and the electric-field intensity at the active loop antenna is measured. Here, to accurately measure the radiated electric field, a distance is typically half or longer than the wavelength λ (a little over 10 m at 13.56 MHz). However, in an experiment, the distance was 6 m due to the limitations of equipment available for the inventors (such as the space of the shielded room).

Here, the antenna device as a source of a leak wave is formed of two magnetic-sheet-attached loop antennas depicted in FIG. 4 connected in series. As depicted in FIG. 2, these two loop antennas are disposed to be vertically symmetrical with respect to the conductor plane so that the opening positions of the antenna loops in opposite directions are superposed each other. Here, as each loop antenna, a Pasori antenna manufactured by Sony Corporation (45 mm×30 mm, only with a two-turn loop antenna, and without a drive circuit or a housing) is used, which is widely used mainly as a reader/writer in non-contact communication systems using 13.56 MHz in the past (as described above).

Figure 14:
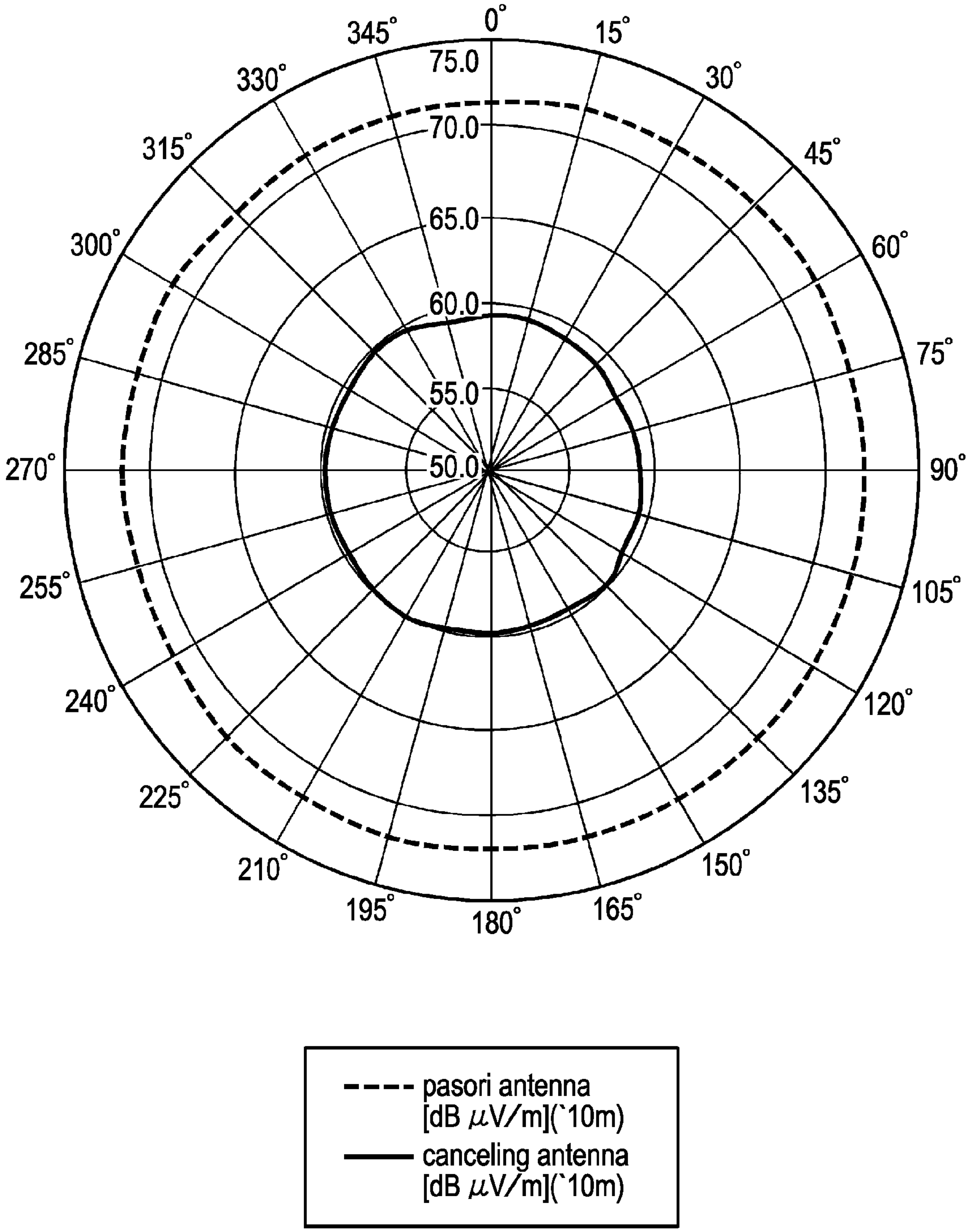
FIG. 14 illustrates measurement results of a jamming-wave suppressing effect of the antenna device according to the embodiment of the present invention (refer to FIG. 4) with the measuring technique depicted in FIG. 13.

FIG. 14 is a graph of measurement results of the antenna device depicted in FIG. 4 with the measuring technique depicted in FIG. 13. In FIG. 14, "canceling antenna" indicates a measurement result according to the measuring technique depicted in FIG. 13 for the antenna device depicted in FIG. 4 with a communication antenna and a canceling antenna in a pair. For comparison, "pasori antenna" indicates a measurement result according to the measuring technique depicted in FIG. 10. From FIG. 14, it can be understood that, according to the antenna device of an embodiment of the present invention (refer to FIG. 4), leak waves in a horizontal direction can be suppressed for 360 degrees.

As described in the foregoing, by using the antenna device according to the embodiments of the present invention, a magnetic field stronger than ever can be output within a limitation of electric-field output intensity stipulated by the Radio Law, thereby improving communication characteristics.

Finally, a perspective of the inventors on using the antenna device depicted in FIGS. 4 and 5 is described.

(1) The communication antenna and the canceling antenna have an equal relation with each other. Therefore, for example, when these antennas are implemented on a no-power-supply IC card and the card is used with its rear side up, the roles of these antennas are merely switched without problems.

(2) At the time of outputting a carrier from the antenna device, not only the communication antenna but also the canceling antenna radiates a magnetic field to suppress a leak wave with the canceling operation depicted in FIG. 12. Thus, in comparison with an antenna device with a loop antenna having a magnetic sheet formed with only a communication antenna, more power is consumed on a transmission side to ensure a communication signal intensity.

Figure 15:
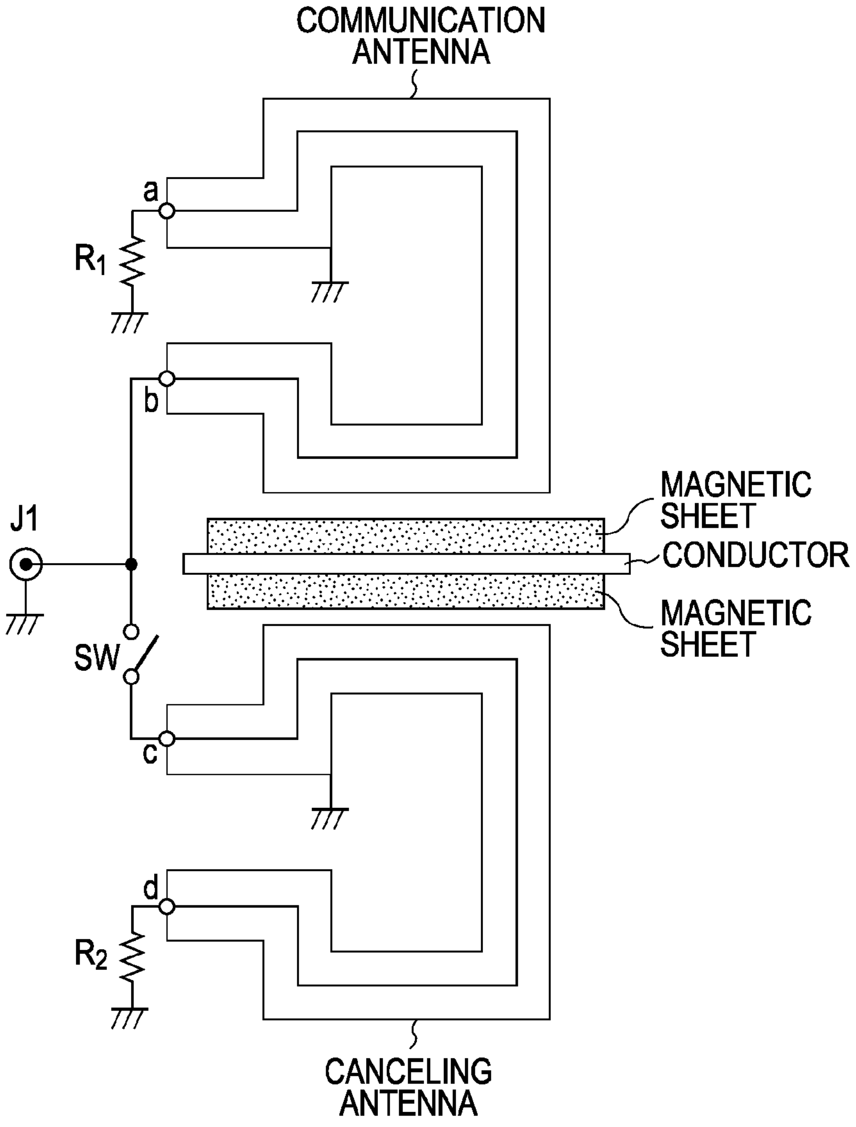
FIG. 15 illustrates a modification example of the antenna device depicted in FIG. 5.
Figure 16:
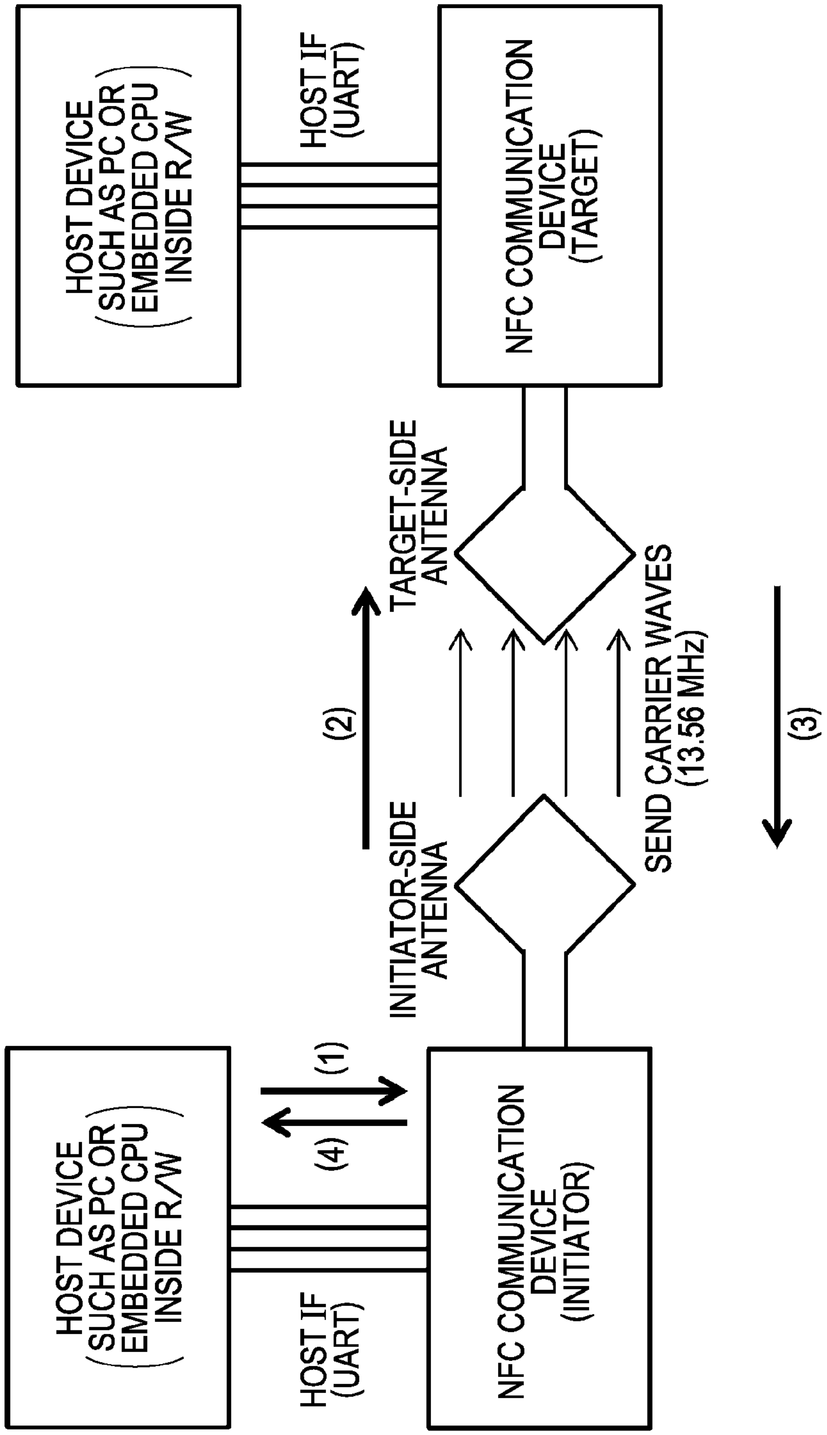
FIG. 16 illustrates a basic configuration of an NFC communication system.
Figure 17:
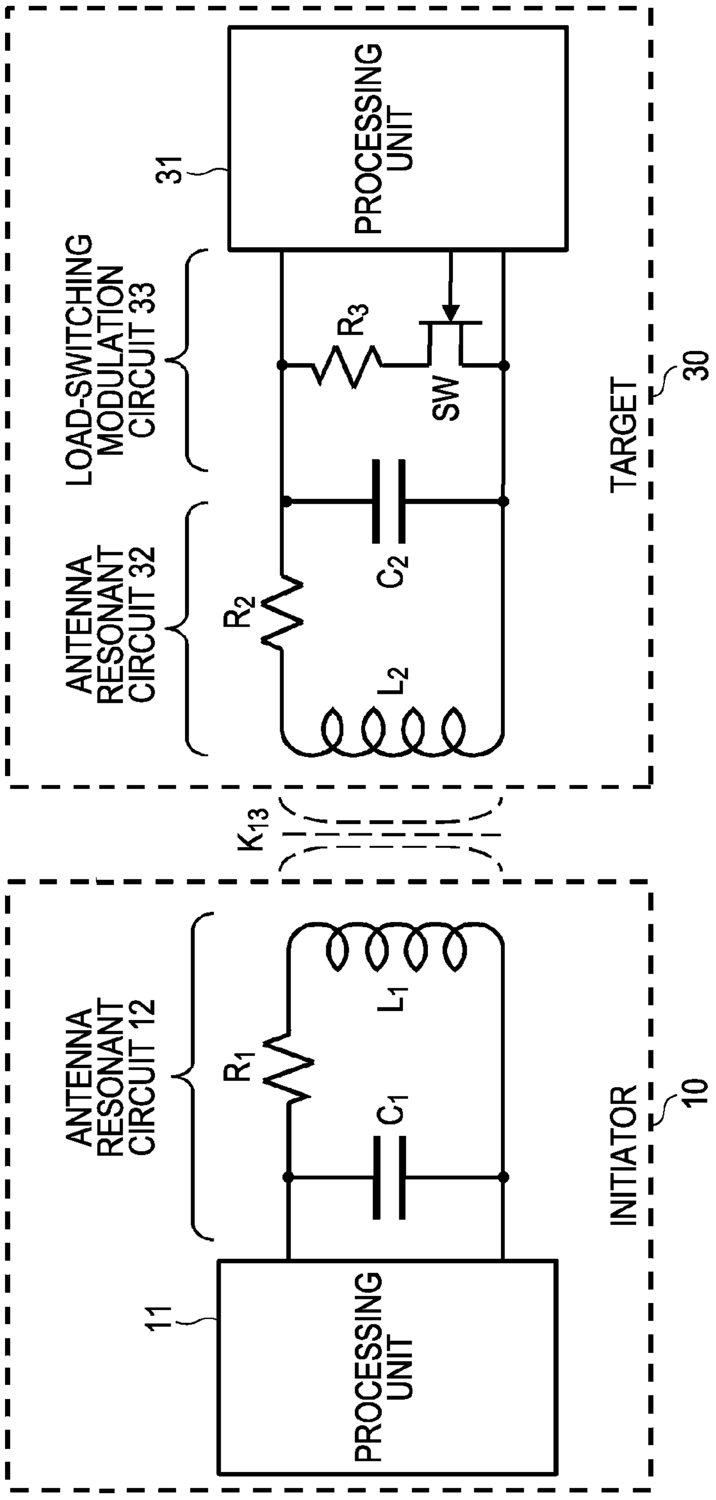
FIG. 17 mainly illustrates an example of the structure of an inductive-coupling portion of a non-contact communication system of an electromagnetic induction type.

By contrast, in wide-band baseband communication, the canceling antenna is provided mainly to remove jamming waves at the time of reception (refer to FIG. 3), and in most cases, leak waves are not removed at the time of transmission. Thus, the canceling antenna may be used only at the time of reception and may be separated from the communication circuit at the time of transmission to reduce power consumption at the time of transmission. FIG. 15 illustrates a modification example of the antenna device depicted in FIG. 5. A switch is inserted into a signal line connecting a canceling antenna to a communication circuit to separate the canceling antenna at the time of transmission and allow a carrier to be outputted only from the communication antenna.

(3) The antenna device including a communication antenna and a canceling antenna according to the embodiments of the present invention can achieve the same antenna distance and communication rate as those of a communication using only a communication antenna. Also, application of the antenna device according to the embodiments of the present invention to both communication devices on transmission and reception sides is eliminated. For example, jamming waves may not be removed on the reception side and it is only desired to increase output electric waves on the transmission side, such as in the case where it is desired to improve an S/N ratio on the reception side in a non-contact communication system at 13.56 MHz, the antenna device according to the embodiments of the present invention is applied only to the transmission side, thereby obtaining sufficient effects. This prevents changes in manufacturing cost on the reception side due to the replacement with the antenna device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication device comprising:

a conductor plane;

a first loop antenna disposed on one surface of the conductor plane via a first magnetic sheet;

a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna; and a communication circuit processing a communication signal transmitted and received by the first and second loop antennas;

wherein the first magnetic sheet is disposed between the first loop antenna and the surface of the conductor plane;

wherein the second magnetic sheet is disposed between the second loop antenna and the another surface of the conductor plane.

2. The communication device according to claim 1, wherein the conductor plane is sufficiently larger in area than an opening shape of each of the first and second loop antenna and each of the magnetic sheets.

3. The communication device according to claim 1, wherein:

the communication device is applied to a non-contact communication system with a steep frequency characteristic; and the communication circuit increases an output electric-field intensity.

4. The communication device according to claim 3, wherein the first loop antenna and the second loop antenna are connected in series to the communication circuit.

5. The communication device according to claim 1, wherein:

the first and second loop antennas are each formed of a shielded loop antenna with a layered structure formed on a single substrate; and the communication circuit performs wide-band baseband communication.

6. The communication device according to claim 5, wherein the first loop antenna and the second loop antenna are connected in parallel to the communication circuit.

7. An antenna device comprising:

a conductor plane;

a first loop antenna disposed on one surface of the conductor plane via a first magnetic sheet;

a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna; and a communication circuit processing a communication signal transmitted and received by the first and second loop antennas;

wherein the first magnetic sheet is disposed between the first loop antenna and the surface of the conductor plane;

wherein the second magnetic sheet is disposed between the second loop antenna and the another surface of the conductor plane.

8. A communication system comprising:

an initiator including a conductor plane, a first loop antenna disposed on one surface of the conductor plane via a first magnetic sheet, a second loop antenna being in a loop direction opposite to a loop direction of the first loop antenna and having an opening structure approximately identical in shape to the first loop antenna, the second loop antenna being disposed on another surface of the conductor plane via a second magnetic sheet so as to be roughly superposed on the first loop antenna, and a communication circuit processing a communication signal transmitted and received by the first and second loop antennas; and a target including a third loop antenna coupling to a magnetic field of either one of the first and second loop antennas and a communication circuit processing a communication signal transmitted and received by the third loop antenna;

wherein the first magnetic sheet is disposed between the first loop antenna and the surface of the conductor plane;

wherein the second magnetic sheet is disposed between the second loop antenna and the another surface of the conductor plane.

9. The communication device according to claim 1, wherein the first loop antenna and the second loop antenna are horizontally symmetrical or vertically symmetrical to each other with respect to the conductor plane.

10. The communication device according to claim 1, wherein the first loop antenna is superposed on the first magnetic sheet, which is superposed on the conductor plane, which is superposed on the second magnetic sheet, which is superposed on the second loop antenna.

* * * * *